United States Patent
Moore et al.

(10) Patent No.: US 10,437,460 B2
(45) Date of Patent: Oct. 8, 2019

(54) METHODS AND APPARATUS FOR CARTOGRAPHICALLY AWARE GESTURES

(75) Inventors: Bradford A. Moore, San Francisco, CA (US); Billy P. Chen, Santa Clara, CA (US); Christopher Blumenberg, San Francisco, CA (US); Patrick S. Piemonte, San Francisco, CA (US)

(73) Assignee: Apple Inc., San Francisco, CA (US)

( * ) Notice: Subject to any disclaimer, the term of this patent is extended or adjusted under 35 U.S.C. 154(b) by 655 days.

(21) Appl. No.: 13/609,762

(22) Filed: Sep. 11, 2012

(65) Prior Publication Data

US 2013/0321257 A1     Dec. 5, 2013

Related U.S. Application Data

(60) Provisional application No. 61/655,909, filed on Jun. 5, 2012.

(51) Int. Cl.
| | |
|---|---|
| *G06F 3/0488* | (2013.01) |
| *G06F 3/0481* | (2013.01) |
| *G01C 21/36* | (2006.01) |

(52) U.S. Cl.
CPC ..... *G06F 3/04883* (2013.01); *G01C 21/3664* (2013.01); *G06F 3/0481* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 6,040,824 A * | 3/2000 | Maekawa | G01C 21/3614 345/173 |
| 7,142,205 B2 | 11/2006 | Chithambaram et al. | |
| 7,752,555 B2 | 7/2010 | Sutanto et al. | |
| 2003/0016252 A1* | 1/2003 | Noy et al. | 345/856 |
| 2007/0300182 A1* | 12/2007 | Bilow | G06F 3/0488 715/799 |
| 2009/0128483 A1* | 5/2009 | Robbins | G06F 3/0481 345/156 |
| 2009/0153492 A1 | 6/2009 | Popp | |
| 2011/0010676 A1 | 1/2011 | Khosravy et al. | |
| 2011/0224896 A1* | 9/2011 | Napieraj | G01C 21/3614 701/532 |
| 2012/0109513 A1* | 5/2012 | Belimpasakis | 701/418 |

\* cited by examiner

*Primary Examiner* — Andre L Matthews
(74) *Attorney, Agent, or Firm* — Robert C. Kowert; Meyertons, Hood, Kivlin, Kowert & Goetzel, P.C.

(57) ABSTRACT

Methods and apparatus for a map tool on a mobile device for implementing cartographically aware gestures directed to a map view of a map region. The map tool may base a cartographically aware gesture on an actual gesture input directed to a map view and based on map data for the map region that may include metadata corresponding to elements within the map region. The map tool may then determine, based on one or more elements of the map data, a modification to be applied to an implementation to the gesture. Given the modification to the gesture implementation, the map tool may then render, based on performing the modification to the gesture, an updated map view instead of an updated map view based solely on the user gesture.

25 Claims, 15 Drawing Sheets

METHODS AND APPARATUS FOR CARTOGRAPHICALLY AWARE GESTURES

This application claims benefit of priority to U.S. Provisional Application Ser. No. 61/655,909, entitled "Methods and Apparatus for Cartographically Aware Gestures," filed Jun. 5, 2012.

BACKGROUND

Mobile devices often provide various mapping related features such as displaying a map view and allowing a user to interact with the displayed map view through, for example, a touch screen. One manner in which a user interacts with a map view is through gesture input to zoom in, zoom out, tilt, pan, or rotate the map view. Traditional mapping applications operable on mobile devices receive raster image data for a given map region of a map view. However, in the case of processing a gesture, raster data is limited in that a traditional mapping application on a mobile device is only responsive to the exact parameters of gesture input. In other words, because any given point within a raster image is indistinguishable from any other given point in the raster image, the mapping application is unable to discern additional information regarding the intent of a gesture based on component elements of a map view.

SUMMARY

In one embodiment, a map tool on a mobile device may receive map data for a map region to be displayed in a map view of a mapping application, where the map data includes metadata corresponding to elements within the map region. The map tool may render, based on the map data, the map view of the map region and receive gesture input corresponding to the map view. The map tool may then determine, based on one or more elements of the map data, a modification to be applied to an implementation of the gesture. For example, if a user performs a zoom gesture and the zoom gesture is directed to a part of the touch screen that is near a city, but not directly centered on the city, then the map tool may determine that a touch point of the gesture is near the city. In this example, the map tool may then determine a modification to the user gesture so that the gesture is directed to the center of the city. Given the modification to the gesture, the map tool may then render, based on the gesture as modified by the modification to the gesture, an updated map view that zooms in to the center of the city instead of zooming in to the touch point of the zoom gesture.

Figure 1A:
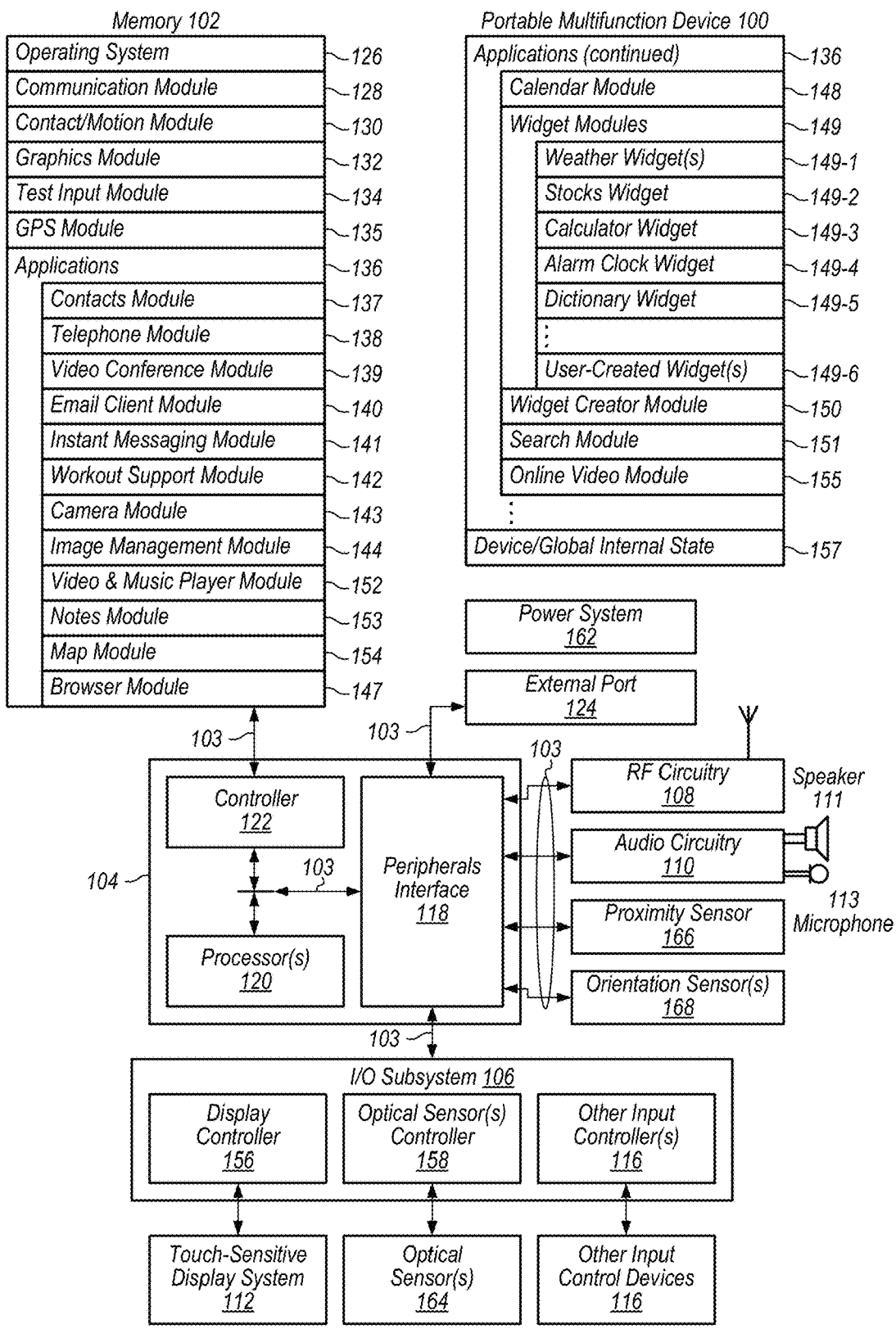
FIG. 1A is an illustration of a mobile device suitable to implement an environment analysis tool, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments are presented of map tool on a mobile device which may determine a cartographically aware gesture in response to a user gesture directed to a map view of a map region. In other words, the map tool may implement a gesture not as performed by a user, but rather the map tool may implement the gesture as modified based on elements of the map. The elements of the map on which the map tool may base a modification to an implementation of the gesture may include metadata associated with sections of the map data for a map region, metadata associated with objects or landmarks within the map region, or objects themselves within the map region, among other elements of the map data. In this way, because many gesture inputs are not precisely where the user intends, the map tool attempts to discern a user's intent for the end result of a gesture, and if the actual gesture is not determined to be the intent of the user, the map tool modifies the implementation of the gesture so that the gesture executed is the gesture the map tool determines as the intent of the gesture input.

In some embodiments, the map tool, for a given region of a map, may identify objects, structures, parks, landmarks, or generally any type of point or region of interest because the received map data provides information to construct a model of the map region. For example, additional types of data on which a map tool may base a modification to an implementation of a gesture include, among others, neighborhood information or metadata, land cover, two-dimensional building footprints, two-dimensional map data or metadata, three-dimensional buildings, three-dimensional models of map regions, boundary lines between different elements on which a modification is based, or search queries or search results. Further, the map data may be annotated with metadata corresponding to certain elements or areas of the map region. With the model of the map region, the map tool may determine a coordinate point within the model corresponding to a gesture. Given coordinates of the gesture, the map tool may calculate relative distances between the gesture coordinates and elements within the model. In this way, the map tool may determine that the gesture coordinates are near, but not exactly centered on, for example, a city. Given the proximity of the gesture coordinates to the center of the city, the map tool may determine that the user, in performing the gesture, intended to focus the gesture on the city, and not on an area peripheral to the city. With the determination that the user gesture was intended to focus on the center of the city, the map tool may determine a modification to the implementation of the gesture so that when the modification is applied, the effect of the modification is to execute the gesture as if the gesture focus were the center of the city.

While in the above example the map tool determines a modification to the user input based solely on cartographic features of the model, namely proximity of gesture coordinates to an element in the model of the map region, the map tool may base the modification on other factors, or in some cases, additional factors. For example, given a display of several points of interest in a map view of a map region, the map may decide to focus a zoom gesture based in part on ranking information of the respective points of interest, and focusing the zoom on the highest ranked point of interest. Other factors may include recent search history, elements of a user profile, elements of profiles of people within one or more of the user's social network, or a combination of each of the factors. Each aspect of the cartographic elements or other factors that provide information regarding one or more elements of a map region in a map view may be referred to as map metadata. In some embodiments, the ranking information is based on crowdsourced information collected from multiple users on a server, and where the server provides the crowdsourced information as metadata corresponding to the map region.

The map tool may auto-apply a modification or correction to any gesture implementation, for example, pinch, selection, zoom, pan, tilt, or rotate. For example, if a user is using a drag gesture to pan across an area of a map view, and the user ends the gesture with a flick, the map view displayed may display additional areas of the map and may decelerate and determine a stopping point based on map metadata corresponding to one or more elements of the map located proximate to the stopping point. Similarly, if a user is panning across an area of the map, the scrolling of the map view across the area of the map may accelerate if there is nothing of interest being panned over. For example, if a user is panning and the current map region for a map view becomes a body of water, or a desert, or an ocean, or a suburb with nothing of interest, then the current map region is scrolled or panned over more quickly than when panning over a map region with more interesting elements or more aesthetically pleasing elements. Further, the acceleration and deceleration of the panning based on cartographic awareness may continue so long as the user maintains the panning gesture.

In some embodiments, a gesture, or detection of the end of the gesture, may trigger animations or animation sequences that are part of the response to implementing the gesture. For some gestures, the animation may provide a sense of the map view gliding beneath a user's fingers when, for example, a user performs a scroll or pan gesture. For example, when a user is scrolling or panning, at the end of the scroll gesture a deceleration animation may decelerate the scroll or pan instead of abruptly stopping the map view updates when the gesture has completed. In such a case, the map tool may automatically apply a modification or correction to an implementation of the animation similarly to other described embodiments for modifying or correcting an implementation of a gesture. For example, without the application of a modification to the implementation of the deceleration animation the deceleration animation may slowly decelerate the scroll for a fixed amount for every end of every scroll gesture. However, similarly to other embodiments applied to gestures discussed herein, the map tool may determine a stopping point to the deceleration animation that is nearby where an unmodified implementation to the deceleration would have been. The amount of adjustment determined may depend on the cartographic elements or other interesting elements that would better serve as the focus to the map view instead of the focus of the map view that would result otherwise. Once the map tool determines an adjustment amount, the implementation of the deceleration animation, as adjusted by the adjustment amount may produce a map view with a focus on more interesting cartographic elements or a more interesting point of interest or points of interest.

In some embodiments, the map tool may automatically apply a modification or correction to a tilt gesture implementation based on one or more features of the objects within a model space representative of the surrounding environment. For example, within an urban area there may be multiple buildings of different heights, and if a user is performing a tilt gesture, the map too may determine that the user is attempting to tilt the map view to a viewpoint above the building. In such a case, if the actual tilt gesture as input by the user would fail to tilt the map view so that a virtual camera viewpoint were from the top of the building, then the map tool may determine a modification to be applied to the gesture implementation so that when the gesture implementation, as adjusted or extended according to the modification, is performed the viewpoint of the map view is from the top of the building. Further in this example, the modification determined may vary even for the exact same gesture based on the building height. In other words, for the same gesture parameters as applied to a tilt of a building of a shorter height the map tool may determine a smaller modification to the gesture implementation than a modification to be applied to a tilt of a taller building in order to present the user with a similar virtual camera viewpoint. In this way, the amount of modification to be applied to a gesture implementation is dependent on a spatial characteristics of an element within the map region, namely the height of a building.

In some embodiments, if a user is currently viewing a 2D version of a map view of a map region, a user may tilt the mobile device, and in response, the mapping application on the mobile device changes the 2D version of the map view into a 3D map view of the map region. In some cases, when the tilt is minimal, the map tool may determine that the user did not intend to change perspectives from 2D view to a 3D view, and therefore the map tool may maintain the 3D map view. However, in this example, given the minimal tilt, the map tool may determine, based on cartographic elements or metadata corresponding to elements in the map view or both, that the even with the minimal tilt that the user intended to switch into a 3D view. For example, if by switching from a 2D view to a 3D view the map tool may display additional information that was not previously visible or displayable, then the map tool may interpret the minimal tilt gesture as a switch from a 2D map view to a 3D map view. In some cases, the map tool may base the determination to interpret the minimal tilt gesture as a switch from a 2D map view to a 3D map view on a search entry. For example, if a user is searching for a point of interest, and if, based on the minimal tilt gesture, the map tool may display more information related to the current search query, then the map tool may interpret the minimal tilt gesture as a tilt from a 2D map view to a 3D map view. In this way, by biasing the interpretation of a tilt gesture toward providing more valuable information, an ambiguously small tilt gesture may be interpreted to provide more relevant results. Further, the threshold for what may be interpreted to be a small or minimal tilt gesture may be based on a adjustable threshold value.

In some embodiments, similar to the determination by the map tool on whether to switch from a 2D map view to a 3D map view based on a tilt gesture, the map tool may perform a determination on whether to switch from a 3D map view to a 2D map view based on a tilt gesture. For example, if a user is currently viewing a 3D map view and the user performs a minimal tilt gesture that would change the map view from a 3D map view to a 2D map view, then the map tool may perform a determination on whether or not the change from a 3D map view to a 2D map view should be implemented. The determination by the map tool may be based on similar factors as discussed above in regard to determining whether to switch from a 2D map view to a 3D map view. For example, if by switching from a 3D map view to a 2D map view, the map tool may display more or additional information to a user, the map tool may interpret the minimal tilt gesture as intending to switch from the 3D map view to the 2D map view. As another example in determining whether or not to switch between 2D and 3D map views, if the map tool determines that information may be lost or less relevant information may be displayable, then the map tool may determine to interpret the gesture to remain in the current map view. In some cases, as above, the determination by the map tool may be based on a current search query. In other cases, determining whether to switch between 2D and 3D map view may be based on whether the user is currently in a navigation mode or not.

In some embodiments, the map tool may use map metadata to disambiguate one gesture from another gesture. For example, in the case that a tilt gesture is similar to a pan gesture, the map tool may determine that a user intended to perform a pan gesture if there is nothing interesting in the map metadata that would be provided to the user if a tilt gesture were performed. In other words, if more or more interesting information could be provided to a user if one gesture instead of another gesture were performed, then the map tool may base the disambiguation of the gestures on the map metadata and interpret the gesture as the one gesture instead of the other gesture.

In some embodiments, the process of disambiguating based on map meta data involves changing the threshold for determining the difference between types of gesture. For example, if for a given threshold ratio of vertical to horizontal motion is defined to be v:h, then one type of gesture may be defined if the ratio of vertical to horizontal motion is above the threshold and a different type of gesture may be defined if the ratio of vertical to horizontal motion is below the threshold. However, in some cases, the map tool may alter the threshold for disambiguating gestures based on elements or features of the map region and a corresponding model of the map region. For example, if the vertical to horizontal ratio of a given gesture is just above the threshold thereby causing an interpretation of a tilt gesture, the map tool may alter the threshold so that the gesture is interpreted to be a rotate gesture if a rotate gesture would result in more interesting results or more aesthetically pleasing results. In other words, the map tool may alter the threshold for disambiguating gestures based on cartographic awareness, or based on other factors discussed above, or based on cartographic awareness in combination with other factors. In some cases, the map tool may disambiguate different types of gestures based on the density of the scene within the map view. For example, if there is a large amount of three-dimensional information in an area, then it may be more likely the user is intending to perform a tilt gesture to better see the three-dimensional information.

In some embodiments, the map tool may modify a gesture implementation based on label information to be displayed in a map view rendering of a map region, where the label information corresponds to elements within the map region of the map view. In certain map views, some elements have labels that are rendered along with the representation of the physical features and elements of a map region. For example, a hot dog stand on a street corner may have a corresponding label and label information, such as "Cuca's Dogs", which may be displayed alongside a three-dimensional rendering of the actual hot dog stand within the map view. In this case, the label may be displayed within a callout or box within the map view. Given that the map tool is aware of the dimensions and coordinates within the map view to be occupied by a label corresponding to an element of the map view, the map tool may determine an adjustment to a gesture implementation so that the gesture as modified according to the determined adjustment may produce a map view such that the label for the hot dog stand is the focus of the map view. In other words, in order to make a label the focus of a map view, the map tool may base an adjustment to a user gesture on the dimensions and coordinates of the label within the model space of a map region, where the model space of the map region corresponds to the real-world physical dimensions of the map region. In this example, if the map tool were not set to display labels, the determined adjustment to a gesture implementation may be slightly different because a map view with the hot dog stand as the focus may be a slightly different from a map view with the label for the hot dog stand as the focus.

In some embodiments, the map tool may adjust a resulting map view in transitioning from a three-dimensional view to a two-dimensional view or in transitioning from a ground-level virtual camera viewpoint to a bird's eye virtual camera viewpoint. For example, in a certain three-dimensional map view some elements may be obscured by objects or structures closer to the viewpoint of the virtual camera. In this case, when the user goes from a three-dimensional view to a two-dimensional view, instead of displaying a two-dimensional representation of the exact region corresponding to the three-dimensional map view, the map tool may display a two-dimensional representation of the three-dimensional map view as adjusted by elements that may now be visible in the two-dimensional map view. In other words, if in a three-dimensional map view a highly ranked a point of interest were obscured, then when the transition to a two-dimensional map view is made the map tool may focus the two-dimensional map view around the highly ranked point of interest instead of simply displaying a two-dimensional version of the exact map region from which the three-dimensional map view was based.

Similarly, in transitioning from a two-dimensional virtual camera viewpoint to a three-dimensional virtual camera viewpoint, the map tool may refocus the map view of the three-dimensional map view so that the map region of the three-dimensional map view is different from the map region of the two-dimensional map view. Specifically, in going from a two-dimensional map view to a three-dimensional map view, some elements of the map which were visible in the two-dimensional map view may become obscured in the three-dimensional map view. In such a case, the obscured elements in the map region are no longer as relevant as some of the elements that remain within the three-dimensional map view. As a result, in generating the three-dimensional map view, the map tool may determine an adjustment to the map region to display that is different from the map region used for the two-dimensional map view, where the adjustment to the map region produces a focus of the three-dimensional map view on one or more elements that are visible in the three-dimensional map view.

In some embodiments, the map tool may adjust a resulting map view in a transition from a ground level virtual camera viewpoint to a bird's eye virtual camera viewpoint. Similarly to the operation of the map tool in transitioning from a three-dimensional view to a two-dimensional view, when the virtual camera viewpoint of a map view transitions from a ground level virtual camera viewpoint to a bird's eye virtual camera viewpoint, the map tool may determine an adjustment so that the map region corresponding to the bird's eye virtual camera viewpoint is different than the map region corresponding to the ground level virtual camera viewpoint. Specifically, when transitioning to a bird's eye virtual camera viewpoint, the map tool may be able to display more elements of the surrounding environment that would be visible in the ground level virtual camera viewpoint. In being able to display more elements of the map region, the map tool may now be able to display one or more elements that may be of interest, or of higher interest that what was displayed before, that were obscured in the ground level virtual camera viewpoint. Further, if the now-visible one or more objects would not be the focus of the map view if the map view were simply a view of the exact region of the ground level map view, then the map tool may determine an adjustment that would result in the one or more objects that are now visible to be the focus of the map view in the bird's eye virtual camera viewpoint. As described above, the determination of what element in the map region should be the focus may be based on various factors or combinations of factors.

Similarly, when the map tool transitions a map view from a bird's eye virtual camera viewpoint to a ground level virtual camera viewpoint, the map tool may refocus the map view of the ground level virtual camera viewpoint where the map region of the ground level virtual camera viewpoint is different from the map region of the bird's eye virtual camera viewpoint. Specifically, in going from a bird's eye virtual camera viewpoint to a ground level virtual camera viewpoint, some elements of the map which were visible in the bird's eye virtual camera viewpoint may become obscured in the ground level virtual camera viewpoint. In such a case, the obscured elements in the map region are no longer as relevant as some of the elements that remain visible within the ground level virtual camera viewpoint. As a result, in generating the ground level virtual camera viewpoint map view, the map tool may determine an adjustment to the map region to display that is different from the map region used for the bird's eye virtual camera viewpoint map view, where the adjustment to the map region produces a focus of the ground level virtual camera viewpoint map view on one or more elements that are visible in the ground level virtual camera viewpoint map view.

In some embodiments, to reduce the possibility of the user being confused due to a different map region being the basis of the map view that the map region prior to the transition, the map tool may perform the transition smoothly. In other words, instead of the user seeing only the two different map views, one map view for the bird's eye virtual camera viewpoint and one map view for the ground level virtual camera viewpoint, the user may see a sequence of map views corresponding to different positions of the virtual camera as the virtual camera moves from the viewpoint of the original bird's eye viewpoint to the ground level viewpoint according to the adjustment determined by the map tool based on cartographic features or other factors. In this way, the user sees the transition of the virtual camera viewpoint as the virtual camera moves from one viewpoint to another viewpoint, thereby reducing the possibility of disorienting the user.

In some embodiments, the map tool may determine user intent, and therefore a modification to a gesture input, based on the type of activity in which the user is engaged. For example, if the user has started a mapping application on a mobile device and the user has entered an address or otherwise specified a destination, the map tool may determine, based on the use of the navigation functionality, that the user is traveling along a route to a destination. Given this situation, the map tool may then determine corrections or modifications to user gesture implementations based on present circumstance of a user navigating along a route. For example, if the current map view of a map region along the route to a destination includes a roadway, then the map tool may take as input a pan gesture and determine that the gesture implementation should be modified or corrected so that the pan pans along the roadway being traveled. In other words, instead of panning corresponding to the pan gesture, the map tool modifies the pan gesture implementation to pan along the route. In this way, the map tool binds the pan to the roadway traveled, thereby providing information that is likely more relevant to the current route. For example, if the user pan gesture implementation is modified to pan along the route, information that might not be presented to the user had the user pan gesture been implemented would now be available to be seen by the user. For example, hotels, gas stations, or eateries along the road being traveled may be seen in the map view instead of what would have been seen in the map view if the actual pan gesture of the user had been implemented.

In some embodiments, while the cartographically aware gestures described above are made possible due to a correspondence between a model of a map region constructed from map data, where the map data includes metadata for the map region, other implementations of cartographically aware gestures are possible. For example, given only raster information for a map region, any point within the raster image is as meaningless as any other point. However, if the raster image is annotated such that a given coordinate within the raster image corresponds to metadata for that coordinate point, then the map tool may then implement a cartographically aware gesture as described above. In other words, in the case of using raster images, while the map tool may not have an object or structure within a model that corresponds with a gesture coordinate, the map tool may instead compare the coordinates of a gesture with the coordinates of points within the raster images that have been annotated with metadata providing the map tool with information for determining a correction or modification to the user gesture. However, given that in some embodiments the map tool constructs a three-dimensional model from vector-based map data for the purposes of displaying a three-dimensional rendering of a map region, the map tool may use the same constructed three-dimensional model for the purposes of implementing cartographically aware gestures.

In some embodiments of cartographically aware gestures, the map tool may apply a modification to a rotate gesture based on map metadata for a map region. For example, if a user executes a rotate gesture to see on the other side of a building displayed within a map view of the map region, the map tool may determine, based on the map metadata, whether or not anything of interest is on the other side of the building. In the case that the rotate gesture as performed by the user would fail to completely rotate the map view to see the other side of the building, the map tool may determine that the rotate gesture implementation should be extended to rotate an additional amount if anything of interest would be displayed if the rotate were extended. In other words, if the rotate gesture by the user would either result with only part of an object of interest in view or result in no part of the object of interest in view, the map tool may determine that it would be more useful to the user to extend the rotate gesture implementation to completely display the object of interest. The object of interest may be a restaurant, a hot dog stand, a work of art, or any element in the map corresponding to map metadata from which the map tool may make determination of the element being interesting to the user.

In some embodiments, the map tool may make corrections or modifications to gesture input that would not result in surprising results. In other words, in most cases, to prevent the display of disorienting results, the map tool may only make small adjustments to a gesture implementation. However, in some cases, when the user gesture is more dramatic, the map tool may make larger adjustments to the input gesture implementation than if the user gesture were more subtle. An example of a dramatic user gesture would be a hard or quick flick gesture on a map view indicating that the user is intending to move across a large area of the map. In this example of a dramatic user gesture, the map tool may exercise greater discretion in when to decelerate and/or where to stop, for example if the map region resulting from implementing the user gesture as input would produce a map view of elements of little interest whereas if the map view of a map region further on would produce a map view of interesting elements, the map tool may extend the user gesture implementation to provide the map view the interesting elements. However, when the user gesture is more subtle, for example, when a user deliberately and slowly executes a rotate gesture, it may be that the user is more concerned with rotating the map view by an exact amount. Therefore, with a more subtle or deliberate gesture, the map tool may exercise less discretion or no discretion in determining a modification to the user gesture implementation or in determining whether any modification to the user gesture implementation is performed at all.

As noted above, the map metadata may include various types of information. For example, the map metadata may include labels for structures or objects in a map region, the map metadata may include information on neighborhoods or regions such as hospital grounds. Further, in some cases, the map tool may implement multiple component processes, where each of the processes may provide a calculation of a measure of how interesting something may be, and where the map tool takes each of the measures from each of the component processes and combines them to produce an overall measure of a level of interest for a particular thing in the map region. For example, one of the multiple processes may calculate a measure of a level of how interesting something may be based on points of interest, another of the multiple processes may calculate a measure of a level of how interesting something may be based on buildings, another of the multiple processes may calculate a measure of a level of how interesting something may be based on regions, and so on. In this example, each process may determine what that process considers the likely target of the input gesture, and the map tool may take each of these process determinations and produce a single overall probable target of the input gesture. The map tool may assign weights to each output of a process, where the weights may be adjustable by the user through a settings user interface which may allow to specify which types of items in a map view are most important, for example, travel-related items, or business-related items, or point of interest-related items, or child-related items, or on some other user-defined indication of what is important.

In some embodiments where the map tool processing is split among different processes, where each process is defined to work on an aspect of the mapping metadata for a map region or elements of a model of the map region, each of the processes may generate as output a probability that a given target element is the intended target element of a user gesture. The map tool may then determine a single most likely target based on a comparison of the different probabilities and targets produces by the multiple processes. In some cases, the map tool may select a target based solely on the target corresponding to the highest probability of being the target of the user gesture. In other cases, the map tool may select a target based on the target being selected by the most or by a majority of the processes, even if the target may not have the single highest probability as determined by a single process. In other cases, the map tool may use a combination of factors, for example, using the target with the highest probability unless there is a majority of processes that select another target.

In some embodiments, the map tool may resort to performing the gesture as input by a user without any modification or correction. For example, a given map region for a map view may have a large quantity of cartographic elements or a large number of elements with metadata. In such a case, the map tool may begin an analysis of the map region to determine an adjustment to a gesture implementation, however, if the map tool does not complete a determination within a threshold amount of time specified prior to beginning the determination, the map tool may abort the determination and perform the gesture as input by the user. In other cases, the map tool may have enough time to complete a determination of a modification to a gesture implementation applied to a map view, however, no element in the map view may not correspond to a level of a measure of interest that sets it apart from any other element. In such a case, the map tool may simply determine to implement the gesture as input by the user without any modification. In other cases, the map tool may always make an adjustment to a gesture implementation, even if the adjustment to the gesture implementation is trivial and produces a minor effect.

In some embodiments, each of the modifications made to a user gesture implementation so that the user experience in manipulating the map through gestures is a symbiotic experience, meaning that results produced by adjustments to a gesture implementation are in harmony with what a user intended. In other words, the map tool may tend toward smaller adjustment over larger adjustments in part because the smaller the adjustment the less likely the user may notice even a wrong determination by the map tool of a user intent. On the other hand, with a larger adjustment there is a greater probability that the user may notice the adjustment and a greater probability that when the map tool determines an adjustment not intended by the user, the user may be bothered by the adjustment.

In some cases, a mobile device may have access to metadata regarding the surrounding environment, including structures, terrain, points of interest, or rating or ranking information for points of interest. The metadata regarding the surrounding environment may be determined from received mapping data, where the mapping data may include information on terrain, and locations, shapes, and dimensions of surrounding objects.

In some cases, a map tool on a mobile device, given mapping information for the surrounding environment, may construct a model representing the surrounding environment. The model may be constructed in a variety of ways.

In some cases, the map tool may generate a three-dimensional model using elements from a two-dimensional data set of mapping information and from a three-dimensional data set of mapping information. For example, two-dimensional maps specifying locations and boundaries of various structures may be available to define the footprint of a given object or structure in a map area. In this example, vector-based three-dimensional mesh data corresponding to the map area may also be available, where within the highly-detailed set of data is information regarding heights of objects for a given location within the map area. The map tool may use the footprint for an object derived from the two-dimensional mapping information and extrude, or extend, the footprint into three-dimensional space using one or more height values, where the one or more height values correspond to one or more points within the footprint. In some cases, the height values are determined from three-dimensional mapping information. This process may be repeated for each object footprint in the map area, and once each object has been similarly processed, the result is a model of a three-dimensional space for the map area derived from multiple data sets from which a map view may be rendered.

An aspect of the three-dimensional model constructed from the two data sets is that the model may not accurately represent the shape of a given building. For example, if for a given footprint a single point in the center of the footprint were correlated to the corresponding point in the three-dimensional mapping information, the footprint for the object may be extruded to the height of the point. However, it may be the case that the top of the object may not be flat. In other words, if a given object has anything but a flat top, there may be multiple height values corresponding to different points within the object footprint. To compensate for the potential inaccuracy, the map tool may, in some cases, use multiple points to determine a height, or in some cases, determine multiple height values. While the constructed model may lack some accuracy, what is gained is a decrease in computational complexity.

Mobile devices may provide a user with map navigation that includes a three-dimensional view corresponding to a current position. In some cases, the three-dimensional view may be constructed based on Global Positioning System (GPS) data, map information from other sources, or based on GPS data combined with map information from other sources. In some cases, a map view may be constructed from map information corresponding to a given address or to some other piece of information from which location information may be derived. For example, from any point on earth, a user may give a voice command to the map tool, such as "show me the front of the Metropolitan Museum of Art in New York City." In response to the voice command, the map tool, may access map information for the location of the Metropolitan Museum of Art in New York City and generate a map view to the user.

In some cases, the map view may be composed of various geometric figures and may be considered a low resolution proxy of the actual, or high resolution version of the surrounding environment. In either the bird's eye view, ground level view, or the isometric view of geometric figures, the map tool may use one or more sources of map information to construct the map view. In some cases, a data source containing of two-dimensional information may be combined with another data source containing three-dimensional information in order to generate a three-dimensional map view. In other cases, a three-dimensional source of mapping information alone may serve as a basis on which to construct a three-dimensional model of the surrounding environment.

In some cases, a user may manipulate a given map view such as through input gestures indicating to the map tool to display a different virtual camera perspective of the map view. For example, within a given map view, a user may wish to see the map view from the other side of a building. However, given that the previously generated model of the map view has already been constructed, the map tool does not need to generate a new 3D model of the map view because the locations and spatial dimensions of object in the previously generated model remain valid for the new virtual camera perspective.

In an embodiment, three-dimensional (3D) data may be 3D mesh data, which may contain data defining the location and orientation of thousands of triangles for a given map view. Further in this embodiment, two-dimensional (2D) data may be obtained from maps for a given city or county which define the locations and the dimensions of footprints for structures, roads, sidewalks, plazas, or other objects. In this embodiment, in the interest of speed and computational complexity, a 3D proxy may be constructed through the transformation of the 2D model into a 3D model using selected pieces of information from the 3D model to enhance the 2D model. For example, if the 2D model provides information regarding the footprint of a given building, the map tool may then reference the 3D model to identify the corresponding location of the footprint of the building. Once the location of the footprint of the building is determined in the 3D model, one or more height values may be extracted from the 3D model for the building. Now, given the footprint of the building and the one or more height values, a rough box or polygon may be extruded to one of the height values, or to some value derived from the height values in order to generate an approximate 3D shape. This process may be repeated for each object in the 2D data, thereby creating a rough, low-resolution version of the surrounding environment.

In some embodiments, a single source of data may be used, for example, the 3D mesh data for the surrounding environment. In this example, a two-dimensional grid may be created, where each grid segment may be extruded based on a height value from the 3D mesh data, where the height value from the 3D mesh data is for a location corresponding to the grid segment. In the case where a given object in the map space overlaps with multiple grid segments, the display of adjacent grid segments may be smoothed into a contiguous three-dimensional object. In this way, a 3D model of the map space may be constructed using only height values extracted from the 3D mesh data.

In an embodiment, three-dimensional data may be three-dimensional mesh data, which may contain data defining the location and orientation of thousands of triangles for a given map view. Further in this embodiment, two-dimensional data may be obtained from maps for a given city or county which define the locations and the dimensions of footprints for structures, roads, sidewalks, plazas, or other objects. In this embodiment, in the interest of speed and computational complexity, a three-dimensional proxy may be constructed through the transformation of the two-dimensional model into a three-dimensional model using selected pieces of information from the three-dimensional model to enhance the two-dimensional model. For example, if the two-dimensional model provides information regarding the footprint of a given building, the environment analysis tool may then reference the three-dimensional model to identify the corresponding location of the footprint of the building. Once the location of the footprint of the building is determined in the three-dimensional model, one or more height values may be extracted from the three-dimensional model for the building. Now, given the footprint of the building and the one or more height values, a rough box or polygon may be extruded to one of the height values, or to some value derived from the height values in order to generate an approximate three-dimensional shape. This process may be repeated for each object in the two-dimensional data, thereby creating a rough, low-resolution version of the surrounding environment.

Detailed Description Considerations

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of mobile devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Mobile Device

Attention is now directed toward embodiments of portable devices with touch-sensitive displays. FIG. 1A is a block diagram illustrating portable mobile device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer-readable storage mediums, including non-transitory computer-readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable mobile device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the mobile device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3A:
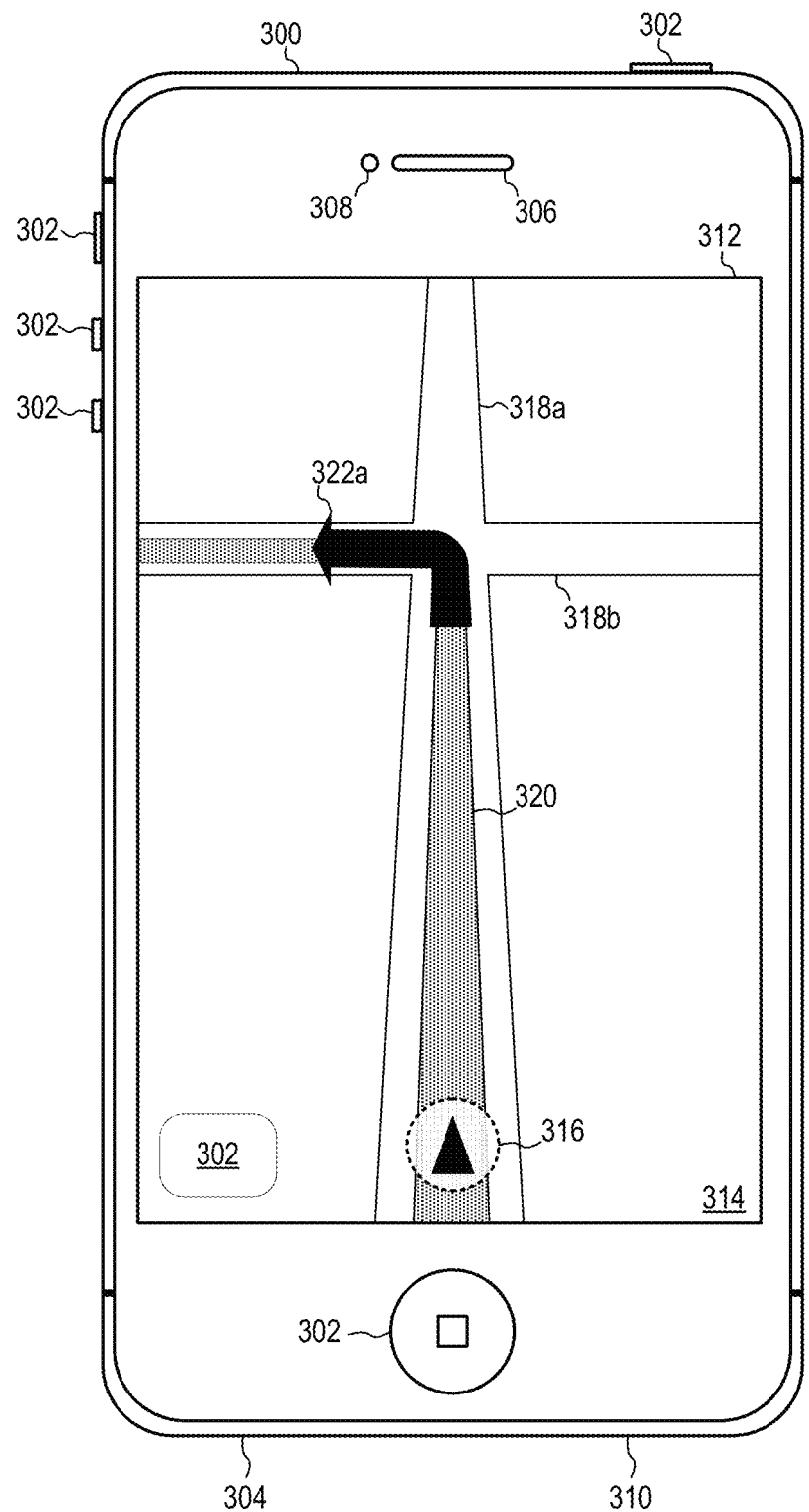
FIG. 3A illustrates another mobile device configurable to implement a mapping application and an environment analysis tool, according to some embodiments.
Figure 3B:
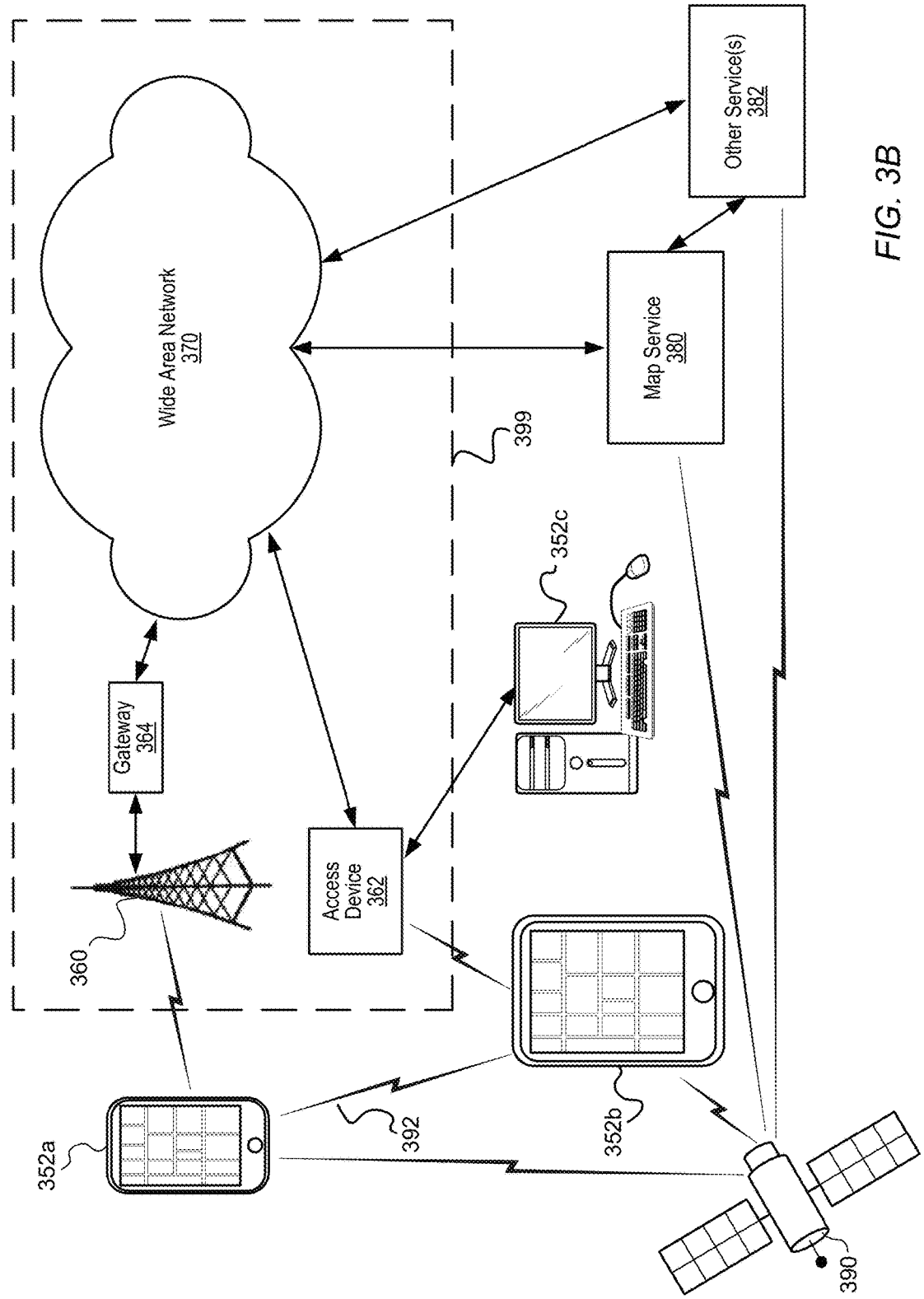
FIG. 3B depicts elements of a map service operating environment, according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. In some embodiments, a gesture may be detected through a camera directed at a user's hand, where the gesture is performed without contact on the screen of the mobile device.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of:
    weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player
  module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
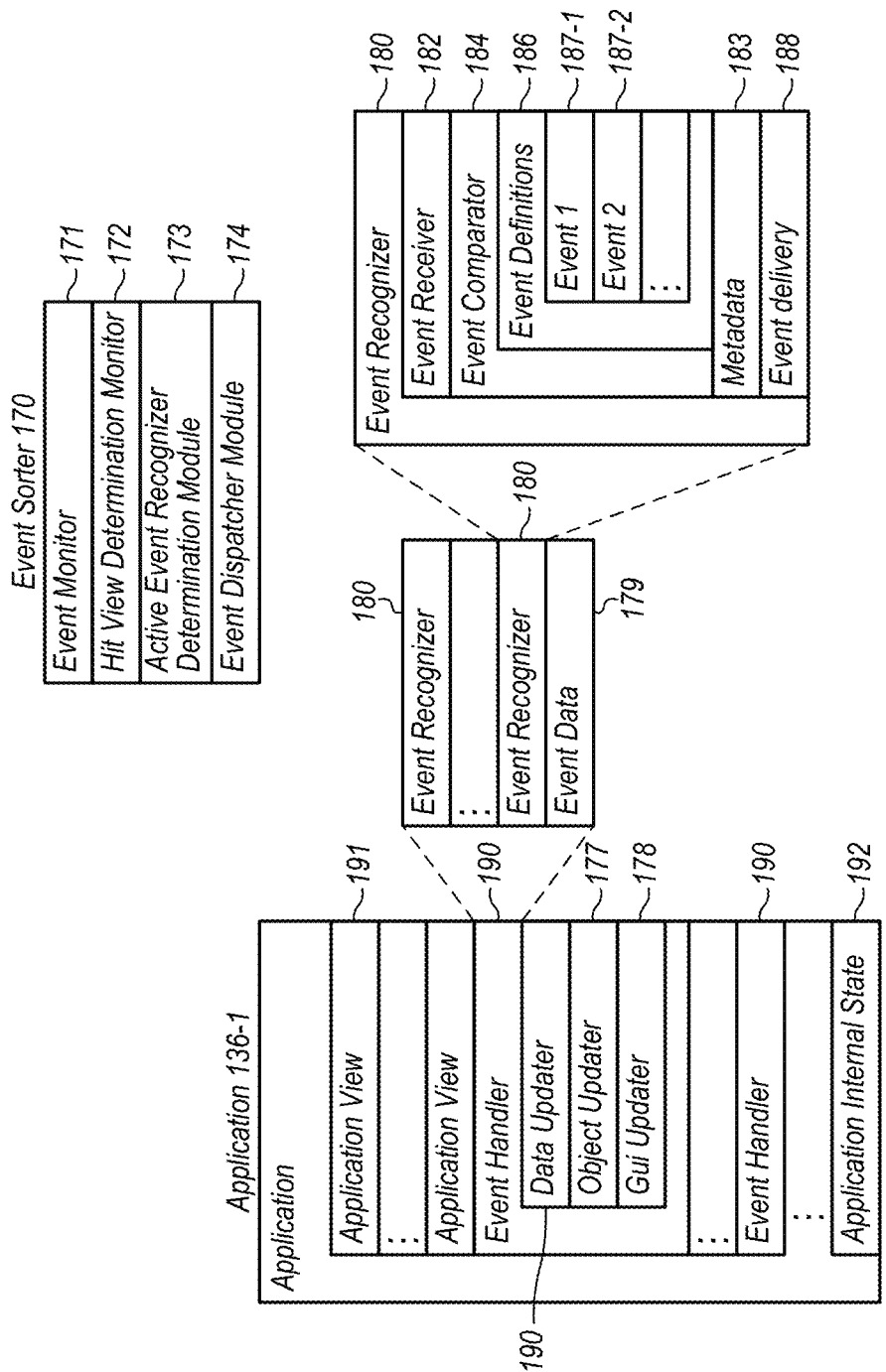
FIG. 1B is a diagram illustrating example components within a mobile device suitable for implementing an environment analysis tool, according to some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes multiple event handlers 190 and one or more application views 191, each of which includes instructions for handling touch events that occur within a respective view of the application's user interface. Each application view 191 of the application 136-1 includes one or more event recognizers 180. Typically, a respective application view 191 includes multiple event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate mobile devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
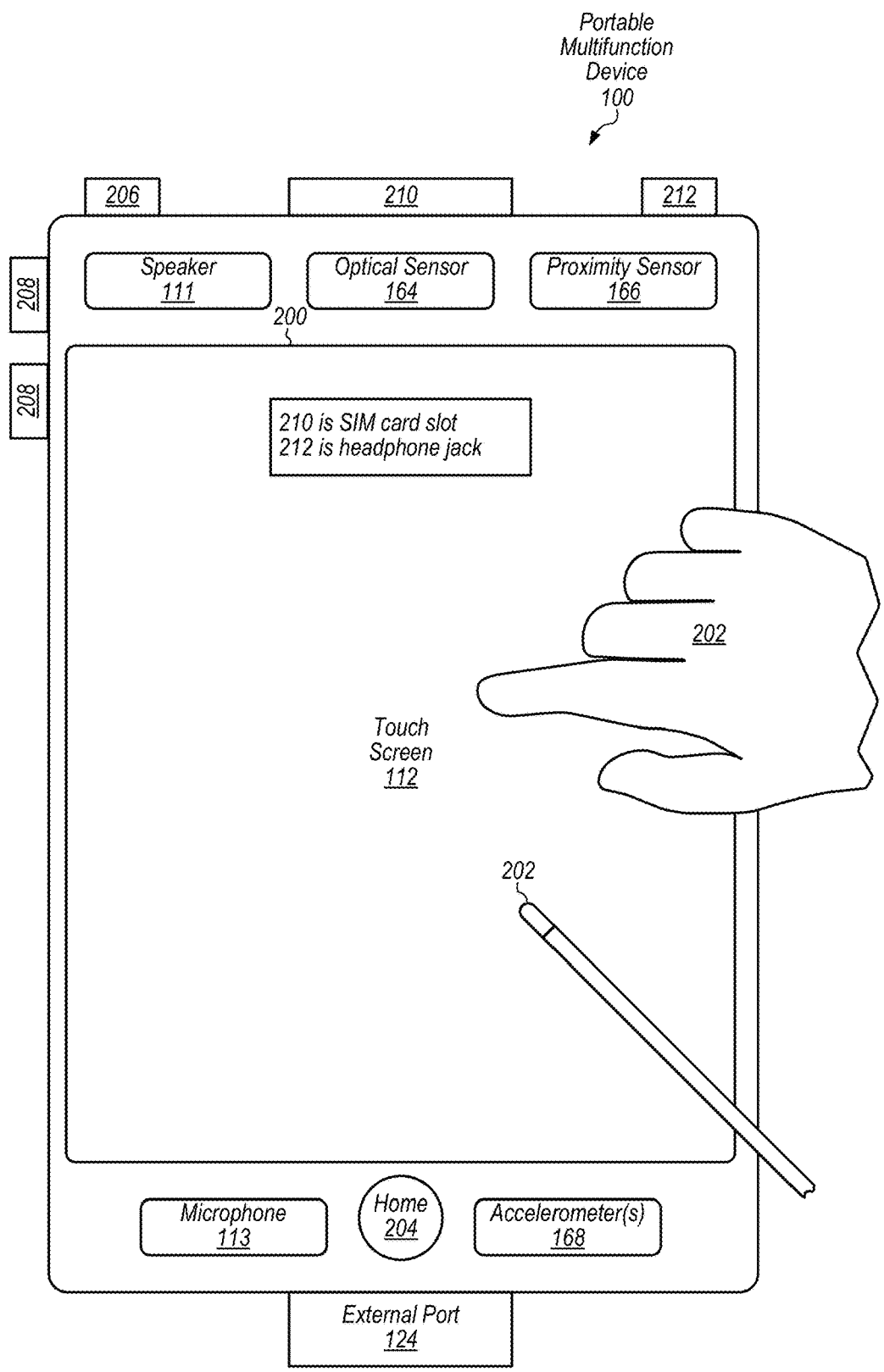
FIG. 2 illustrates a touch screen on a mobile device, according to some embodiments.

FIG. 2 illustrates a portable mobile device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Map Service Operating Environment

Various embodiments of a map tool may operate within a map service operating environment. FIG. 3 illustrates a map service operating environment, according to some embodiments. A map service 380 may provide map services for one or more client devices 352*a*-352*c* in communication with the map service 380 through various communication methods and protocols. A map service 380 generally may provide map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 352*a*-352*c* may utilize these map services by obtaining map service data. Client devices 352*a*-352*c* may implement various techniques to process map service data. Client devices 352*a*-352*c* may then provide map services to various entities, including, but not limited to, users, internal software or hardware modules, and/or other systems or devices external to the client devices 352*a*-352*c*.

In some embodiments, a map service may be implemented by one or more nodes in a distributed computing system. Each node may be assigned one or more services or components of a map service. Some nodes may be assigned the same map service or component of a map service. A load balancing node may distribute access or requests to other nodes within a map service. In some embodiments a map service may be implemented as a single system, such as a single server. Different modules or hardware devices within a server may implement one or more of the various services provided by a map service.

A map service may provide map services by generating map service data in various formats. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map may produce the original map. Tiles may be generated from map image data, routing or navigation data, or any other map service data. In some embodiments map tiles may be raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or a Drawing File (.drw). Embodiments may also include tiles with a combination of vector and raster data. Metadata or other information pertaining to the map tile may also be included within or along with a map tile, providing further map service data to a client device. In various embodiments, a map tile may be encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 352a-352c) may be implemented on different device types. Examples of a portable-mobile device include the devices illustrated in FIGS. 1 through 3 and 9, such as mobile device 100 and mobile device 300. Client devices 352a-352c may utilize map service 380 through various communication methods and protocols described below. In some embodiments, client devices 352a-352c may obtain map service data from map service 380. Client devices 352a-352c may request or receive map service data. Client devices 352a-352c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 3 illustrates one possible embodiment of an operating environment 399 for a map service 380 and client devices 352a-352c. In some embodiments, devices 352a, 352b, and 352c can communicate over one or more wire or wireless networks 360. For example, wireless network 360, such as a cellular network, can communicate with a wide area network (WAN) 370, such as the Internet, by use of gateway 364. A gateway 364 may provide a packet oriented mobile data service, such as General Packet Radio Service (GPRS), or other mobile data service allowing wireless networks to transmit data to other networks, such as wide area network 370. Likewise, access device 362 (e.g., IEEE 802.11g wireless access device) can provide communication access to WAN 370. Devices 352a and 352b can be any portable electronic or computing device capable of communicating with a map service, such as a portable mobile device described below with respect to FIGS. 1 to 3 and 9. Device 352c can be any non-portable electronic or computing device capable of communicating with a map service, such as a system described below in FIG. 3.

In some embodiments, both voice and data communications can be established over wireless network 360 and access device 362. For example, device 352a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 360, gateway 364, and WAN 370 (e.g., using Transmission Control Protocol/Internet Protocol (TCP/IP) or User Datagram Protocol (UDP)). Likewise, in some implementations, devices 352b and 352c can place and receive phone calls, send and receive e-mail messages, and retrieve electronic documents over access device 362 and WAN 370. In various embodiments, any of the illustrated client device may communicate with map service 380 and/or other service(s) 382 using a persistent connection established in accordance with one or more security protocols, such as the Secure Sockets Layer (SSL) protocol or the Transport Layer Security (TLS) protocol.

Devices 352a and 352b can also establish communications by other means. For example, wireless device 352a can communicate with other wireless devices (e.g., other devices 352a or 352b, cell phones) over the wireless network 360. Likewise devices 352a and 352b can establish peer-to-peer communications 392 (e.g., a personal area network) by use of one or more communication subsystems, such as Bluetooth® communication from Bluetooth Special Interest Group, Inc. of Kirkland, Wash. 352c can also establish peer to peer communications with devices 352a or 352b. (not pictured). Other communication protocols and topologies can also be implemented. Devices 352a and 352b may also receive Global Positioning Satellite (GPS) signals from GPS 390.

Devices 352a, 352b, and 352c can communicate with map service 380 over the one or more wire and/or wireless networks, 360 or 362. For example, map service 380 can provide a map service data to rendering devices 352a, 352b, and 352c. Map service 380 may also communicate with other services 382 to obtain data to implement map services. Map service 380 and other services 382 may also receive GPS signals from GPS 390.

In various embodiments, map service 380 and/or other service(s) 382 may be configured to process search requests from any of client devices. Search requests may include but are not limited to queries for business, address, residential locations, points of interest, or some combination thereof. Map service 380 and/or other service(s) 382 may be configured to return results related to a variety of parameters including but not limited to a location entered into an address bar or other text entry field (including abbreviations and/or other shorthand notation), a current map view (e.g., user may be viewing one location on the mobile device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 380 and/or other service(s) 382 may be configured to provide auto-complete search results that may be displayed on the client device, such as within the mapping application. For instance, auto-complete search results may populate a portion of the screen as the user enters one or more search keywords on the mobile device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the internet) by map service 380 and/or other service(s) 382, and/or some combination thereof. As is the case with commands, any of the search queries may be entered by the user via voice or through typing. The mobile device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the mobile device may be configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 380 and/or other service(s) 382 may provide one or more feedback mechanisms to receive feedback from client devices 352*a-c*. For instance, client devices may provide feedback on search results to map service 380 and/or other service(s) 382 (e.g., feedback specifying ratings, reviews, temporary or permanent business closures, errors etc.); this feedback may be used to update information about points of interest in order to provide more accurate or more up-to-date search results in the future. In some embodiments, map service 380 and/or other service(s) 382 may provide testing information to the client device (e.g., an A/B test) to determine which search results are best. For instance, at random intervals, the client device may receive and present two search results to a user and allow the user to indicate the best result. The client device may report the test results to map service 380 and/or other service(s) 382 to improve future search results based on the chosen testing technique, such as an A/B test technique in which a baseline control sample is compared to a variety of single-variable test samples in order to improve results.

Example Mapping Functionality

FIG. 3 illustrates another example of a mobile device that may implement a map tool in accord with the embodiments described, where the mobile device may be configured in a manner similar to the mobile device described above. In the illustrated embodiment, a mobile device 300 includes a mapping application (e.g., map module 154 described above) that may be stored in one or more memories of mobile device 300 and executed on one or more processors of mobile device 300. As is the case for the mobile device described above, mobile device 300 may include one or more controls 302 for operating the mobile device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 312 that may be selected by a user, such as by way of touch in accordance with the touch screen functionality described above.

Mobile device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above. In various embodiments, controls (e.g., on screen control(s) 302) may be utilized to perform any of a variety of map-related functions including but not limited to zoom in, zoom out, rotate screen, pan screen, toggle views (e.g., two-dimensions to three dimensions and vice versa), and/or another map related activity. In various embodiments, one or more gestures may be utilized to perform any of the aforesaid map controls (with or without the use of an actual graphical on-screen control). In one non-limiting example, a one figure gesture may be utilized to adjust the pitch within a three-dimensional map view.

As noted above, mobile device 300 includes a mapping application that may be stored in one or more memories of mobile device 300 and executed on one or more processors of mobile device 300. In the illustrated embodiment, the graphical representation of the mapping application may include a map 314 of a geographic region. This map may be presented as a two-dimensional map or a three-dimensional map, the selection of which may be specified through, e.g., a user-configurable parameter of the mapping application. In some embodiments, the mobile device may toggle between two-dimensional map or three-dimensional map views responsive to input from any input component of the mobile device. In one non-limiting example, input from orientation sensor(s) 168 may initiate the transition from a two-dimensional map view to a three-dimensional map, and vice versa. For instance, one or more of orientation sensor(s) 168 may detect a tilt (e.g., a user-initiated tilt) in the orientation of the mobile device and, in response, initiate the aforesaid toggling.

Map 314 may include a graphical position indicator 316, which may represent the location of the mobile device within the geographic region of the map. Generally position indicator 316 may represent the current or real-time position of the mobile device, although it should be understood that in some cases there may exist some small amount of temporal latency between the actual position of the mobile device and the graphical representation of that location (e.g., position indicator 316). This may occur, e.g., when the mobile device is in motion. In various embodiments, the mobile device may be configured to perform map matching including but not limited to aligning a sequence of observed user positions with a road network on a digital map. In various embodiments, the mobile device may be configured to perform a "snap to" function in which the graphical position indicator 316 is aligned onto a roadway when the user's position falls within in a specified threshold distance of the roadway.

Furthermore, mobile device 300 may generally be operated by a user. For example, mobile device 300 may in some cases be a smartphone utilized by an individual to make phone calls, send text messages, browse the internet, etc. As use of mobile device by an individual generally implies the individual is proximate to the mobile device (e.g., the user may be holding the device in his or her hand), references herein to the location of the device and the location of the user may be considered to be synonymous. However, it should be understood that in some cases the actual position of the mobile device and the user of that device may differ by some distance. For instance, the user may place his or her mobile device on a table of an outdoor café while sitting in a nearby chair. In this case, the position of the device and the position of the user may differ by some small amount. In another example, mobile device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the mobile device and the position of the mobile device user may be considered to coincide.

In various embodiments, the map 314 displayed by the mobile device may include one or more roads (e.g., roads 318*a*-*b*), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, bookmarked/saved location, or point of interest). For instance, an indication of the origination and/or destination may be input into the multi function device by the user. The mobile device may generate one or more candidate routes between those two points. The mobile device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user (in 2D or 3D), such as a graphical indication to perform a turn 322*a* from road 318*a* to road 318*b*. In some embodiments, this graphical indication to perform a turn may be supplemented or substituted with an audible indication to turn, such as a voice command from speaker 310 that indicates the user is to "turn left in 100 yards," for example. In some embodiments, the route that is selected may be presented to the user as a route overview. For instance, before proceeding with navigation, the mobile device may generate a route overview display that graphically indicates key information for the route, such as key turns, route distance and/or an estimated time for traversing the route. In some cases, the mobile device may be configured to generate a display of driving maneuvers (e.g., turns, lane changes, etc.) that occur in quick succession, either in the route overview or during actual navigation. This information may help the user safely prepare for such maneuvers. In some cases, the route information may be presented in a list format, such as a list of turns or other maneuvers.

In various embodiments, the mapping application of the mobile device may be configured to track the position of the user over time and correspondingly adjust the graphical position indicator 316 to indicate the new position. For instance, the mapping application may determine that the user is traveling along route 320 from position information (e.g., information from GPS module 135) and update the map 314 accordingly. For instance, in some cases the map 314 may remain stationary while position indicator 316 is moved along the route. In other cases, position indicator 316 may remain stationary or "fixed" while map 314 is moved (e.g., panned, turned, etc.) around the position indicator.

In various embodiments, the mobile device may be configured to display alternate or contingency routes. In some cases, these routes may be selectable by the user (e.g., via the touch screen interface). In other cases, the mobile device may select a best route based on one or more parameters, such as shortest distance or time. In some cases, these parameters or preferences may be set by the user.

As described in more detail below, the mobile device may in various embodiments receive routing information that specifies a route from a map service. In some case, the mobile device may carry out navigation guidance in accordance with this route. However, in some cases, the mobile device may perform a reroute operation in order to generate a new route to the destination. For instance, the user may have deviated from the original route or explicitly requested a new route. In some cases, the mobile device may perform rerouting based on cached map data stored on the mobile device.

In various embodiments, the mobile device may be configured to perform route correction based on real-time data, such as updates in map information, road conditions, traffic conditions, and/or weather conditions. For instance, the mobile device may be configured to alter a route such that the route avoids a construction zone or a dangerous storm cell.

In various embodiments, the mobile device may be configured to perform lane guidance independently or as part of navigation guidance. For instance, the mobile device may, in response to detecting that multiple turns follow in quick succession, provide the user with a direction or suggestion as to which lane to occupy. For instance, a voice or visual indication may specify that the user "turn right, then move to the left lane" in anticipation of a subsequent left turn. In another example, the mobile device may detect one or more lane closures (e.g., due to construction or other reasons) and instruct the user to avoid such lanes.

In various embodiments, the mobile device may be configured to generate voice prompts for directions. For instance, during navigation guidance, the mobile device may be configured to generate audio representations of the next turn or driving maneuver on the route. For instance, the mobile device may be configured to audibly indicate the user should "turn left in 100 yards" or some other audible indication of a maneuver.

In various embodiments, the mobile device may be responsive to various voice commands for performing actions including a command to obtain a route. For instance, the mobile device may interpret the user's voice through a microphone or other transducer of the mobile device. The user may specify an origination and a destination for the requested route. In various embodiments, the mobile device may be configured to utilize the user's current location as the origination for the route.

In various embodiments, the mobile device may be configured to perform a search along a specific route, such as current navigation route. For instance, the user of the mobile device may request the location of points of interest, such as fuel stations or restaurants. However, if a user is traveling along a particular route, they may not be particularly interested in points of interest that are not proximate to that route. As such, the mobile device may be configured to scope any searches to points of interested within a specified distance away from the route. In various embodiments, this distance may be a configurable parameter.

In various embodiments, the mobile device may be configured to display various graphical layers including but not limited to a graphical map information, aerial images (e.g., satellite-acquired images), and/or traffic information. For instance, in the traffic information example, the mobile device may overlay color coded traffic information on roadways to indicate the speed at which traffic is flowing. For example, green color coding may be used to indicate traffic is flowing normally, and yellow or red may be used to indicate traffic slowdowns.

In various embodiments, the mobile device may be configured to display any quantity of metrics or statistics about a navigation route including but not limited to an estimated time of arrival, travel distance remaining, average speed (overall or moving average), top speed, and/or other route statistics.

In various embodiments, the mobile device may be configured to display routes at different angles in order to accommodate the preferences of different users. Such viewing angles may include a birds eye view for two-dimensional maps to any of a variety of camera angles available for a three-dimensional map.

In various embodiments, the mobile device may be configured to provide navigation information other than map and routing information. For instance the mobile device may expose output from any of the hardware device described above with respect to FIG. 1. In one non-limiting example, an orientation sensor 168 may include a compass that outputs direction data. The mobile device described herein may be configured to display this directional data as a virtual compass, for example.

Example Map Tool

FIGS. 4A-4E are a flowcharts depicting selected processing stages of embodiments of map tool as implemented within a mobile device or within a desktop computer. The map tool may be invoked as part of an event handling routine for processing mapping data received on the mobile device, such as mobile device 300. The map tool may engage the services of Map Service 380 within the map service operating system as described in regard to FIG. 3. In some embodiments, the map tool may also engage the services of or work in cooperation with Contact/Motion Module 130, discussed above, in order to identify and in order to modify a given gesture implementation.

Figure 4A:
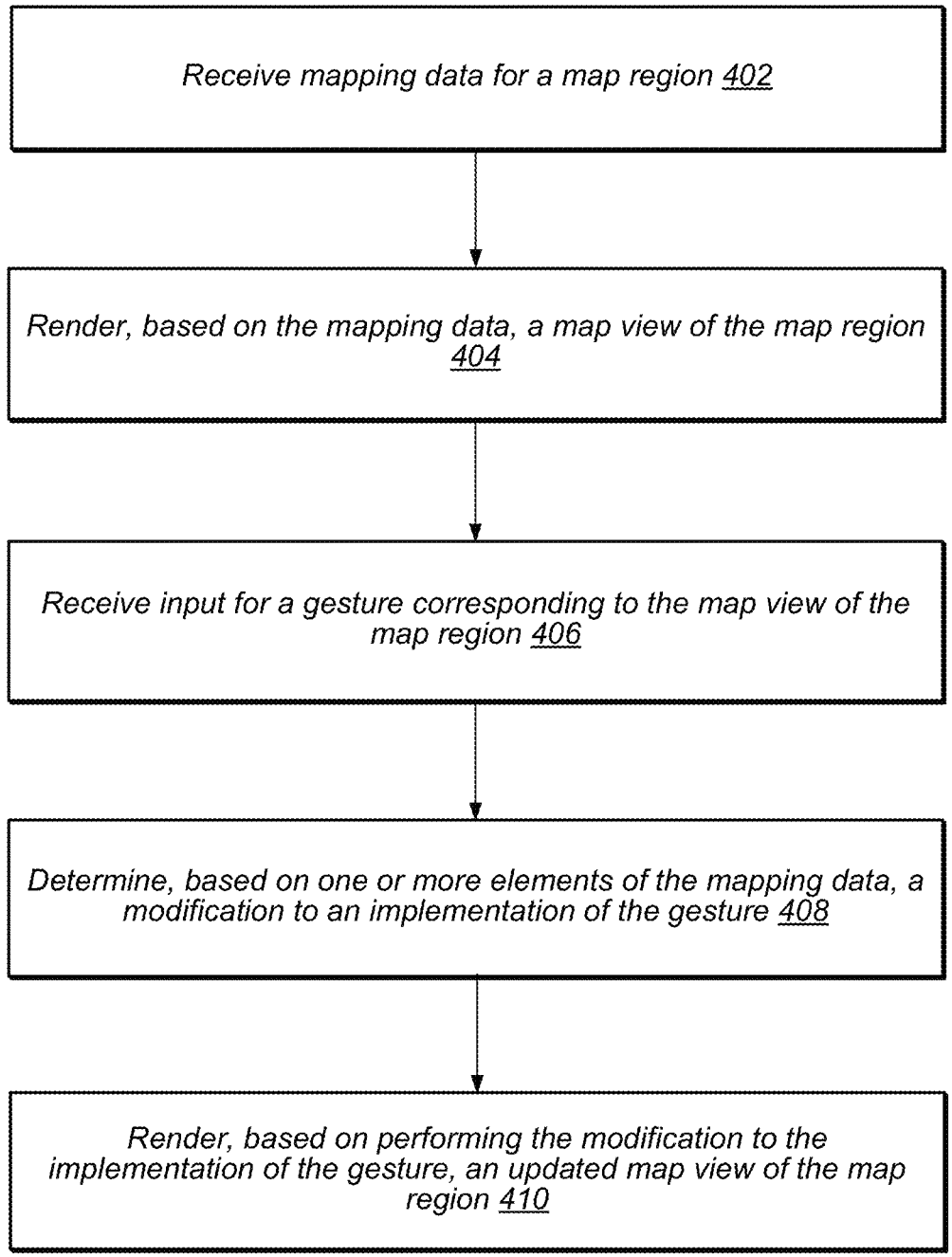
FIGS. 4A-4E depict example flowcharts corresponding to different embodiments of an environment analysis tool, according to some embodiments.

As per FIG. 4A, in some embodiments, a map tool may receive mapping data for a surrounding environment within a map region, as reflected in stage 402. The map region may be a region surrounding a mobile device or the map region may be indicated from a desktop machine. This same mapping data may serve as the basis for generating and displaying a map view of the map region to a user. As part of the process of rendering a map view, the map tool may construct a three-dimensional model of the map region from the mapping data, as reflected in stage 404. In some cases, the mapping data is vector data and not raster image data. The mapping data may be received or requested from Map Service 380.

Given a rendering of a map view of a map region, a user may interact with the map view in order to further specify or otherwise manipulate the map view to obtain desired information. For example, a user may provide gesture input which may be received by Contact/Motion Module 130 and provided to the map tool, as reflected in stage 406.

Given the gesture, or more specifically, the parameters of the gesture as applied to the map view of the map region, the map tool may determine a modification to be made to the gesture implementation. As discussed above, the mapping data may include metadata corresponding to elements within the map region, and because the map region corresponds to the three-dimensional model of the map region constructed, the map metadata also corresponds to the three-dimensional model. Therefore, given parameters for the gesture, where the parameters may include coordinates for a point in the three-dimensional space of the model where the gesture begins and another point in the three-dimensional space of the model where the gesture ends, the map tool may determine the metadata that may be relevant to the coordinates of the gesture. In some cases, the metadata may be determined to be relevant based on proximity of the coordinates of the end of the gesture as input by the user to elements within the three-dimensional model.

The factor or factors used by the map tool to determine whether or not one or more of the elements or metadata for elements may serve as the basis for determining a modification to an input gesture may vary. In some cases, the map tool may base a decision solely on metadata that provides a ranking of points of interest within the map view. As reflected in stage 408, the one or more elements of the mapping data used by the map tool to determine a modification to an input gesture implementation may be map metadata with ranking information for elements of the mapping data, where the elements of the mapping data are indicated in the three-dimensional model of the map region. For example, if the map view as updated by the input gesture, without modification, would result in a map view focused around a poorly ranked hot dog stand, while a highly ranked churro stand is occluded, then the map tool may determine a modification to the gesture implementation that would result in the map view produced by the user gesture to be a map view with the churro stand as the focus of the map view. In this example, the determination of an adjustment or modification to the input gesture implementation would be an extension of the original gesture parameters so that the map view produced by the gesture implementation as modified according to the adjustment or modification would be a map view focused around the churro stand.

In some embodiments, to produce the effect of the modified gesture implementation, the map tool may coordinate with the Contact/Motion module 130 to provide the Contact/Motion module 130 with parameters for implementing a gesture such that the parameters are changed from the original input parameters corresponding to the original input gesture such that the changed parameters correspond with the modification to the gesture implementation determined by the map tool to produce a map view with the focus on the churro stand instead of the focus of the map view on the hot dog stand. The parameters of the gesture implementation may be changed, for example, with a replacement of the coordinate points for the gesture, where the coordinate points correspond to locations on the touch screen, and where the coordinate points define the scope of the gesture across the touch screen.

Given a determined modification to an input gesture implementation, the map tool may render, based on performing the determined modification to the implementation of the gesture, an updated map view of the map region, as reflected in stage 410. In the case of a mobile device, the updated map view would be the map region surrounding the mobile device, and in the case of a desktop computer, the updated map view would be the map region indicated through a specified location.

As discussed elsewhere, if the result of the gesture as input by the user, without modification or correction, would be a map view with one or more elements of interest partially or completely occluded while other, less interesting elements would be more visible, then the map tool may determine that the effect of the input gesture would be more valuable if the gesture implementation were modified to display more of the elements of interest. However, in some embodiments, the map tool may be constrained to modify the gesture implementation according to a maximum threshold of modification so as not to disorient the user by making too large of a modification to the user gesture implementation.

Further, the threshold of modification may depend on how subtle or how quickly the user gesture is made. In other words, the map tool may base a magnitude by which to modify a gesture implementation on more than the spatial coordinates defining the gesture. Specifically, the map tool may base a magnitude by which to modify a gesture implementation based on how quickly a gesture is made. In some cases, if the gesture occurs slowly, then the map tool may restrict the maximum threshold of an amount by which to modify the input gesture implementation to a small amount or to a zero amount. In some cases, if the gesture occurs quickly, then the map tool may restrict the maximum threshold of an amount by which to modify the input gesture implementation to a larger amount (with respect to the amount corresponding to slower gestures).

Figure 4B:
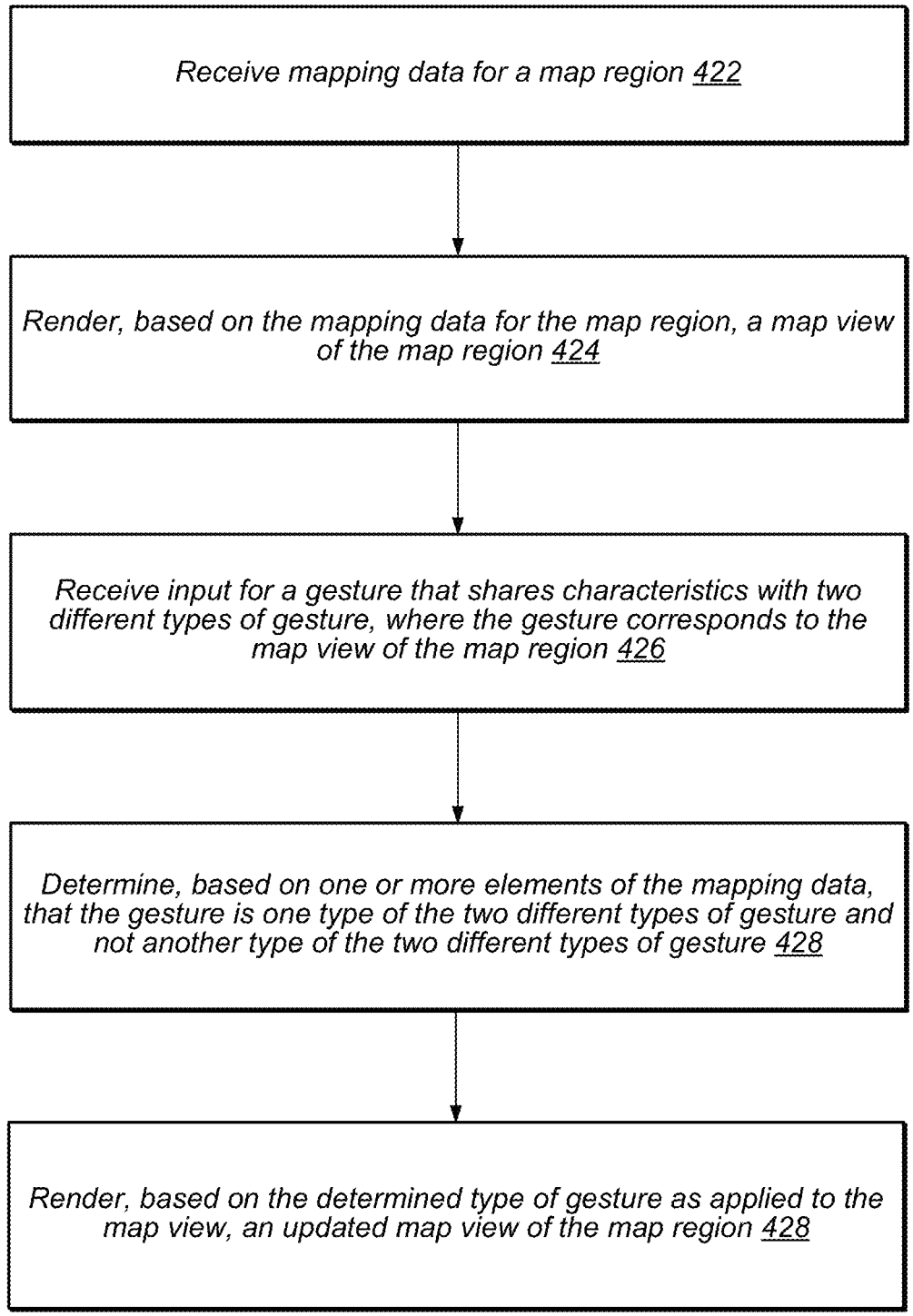

As per FIG. 4B, in some embodiments, a map tool may receive mapping data for a map region for either a mobile computing device or for a desktop machine, as reflected in stage 422. This same mapping data may serve as the basis for rendering and displaying a map view of the map region to a user, as reflected in stage 424. As part of the process of rendering a map view, the map tool may construct a three-dimensional model of the map region from the mapping data. The mapping data may be received or requested from Map Service 380.

With a map view rendered on a display, a user may perform a gesture to manipulate some aspect of the map view. As discussed above, a gesture may be any type of gesture recognizable to interact with the map view, such as a pan, tilt, pinch, zoom in, zoom out, rotate, among others. In the case of a mobile device, gestures may be recognized through an interaction with a touch screen. In the case of desktop computers, a gesture may be recognized through a camera interpreting a user's actions as a gesture. However, a mobile device may also use a camera to recognize gestures and a desktop computer may use a touch screen to recognize gestures.

As discussed above, different gestures may be defined according to different respective gesture characteristics. However, there may be some overlap in the defining characteristics of different gestures, and in such a case, the map tool may rely on cartographic features of the map region to disambiguate between gestures. Further, in cases of ambiguous gestures, the map tool may use other factors in addition to the cartographic features of the map on which to base a determination on how to disambiguate between different gestures. For example, the current mode of the mapping application may serve as a factor in disambiguating gestures. In this example, if the user has indicated a destination address or location and if one gesture would result in a map view with a travel-related element as the focus of the map view whereas another gesture would result in a map view with a non-travel related element as the focus of the map view, then the map tool may determine which gesture to implement based on the travel-related element.

In this example, as reflected in stage 426, the map tool may receive input for a gesture that shares characteristics with at least two different types of gestures, where the gesture corresponds to a user interaction with a map view of the map region. The map tool may then, based on one or more cartographic elements of the mapping data and possibly in addition to map metadata, determine that the gesture is one type of gesture of the at least two different types of gesture and not another type of gesture of the two different types of gesture, as reflected in stage 428.

Once the map tool has disambiguated between the possible types of gestures the input gesture may have been, the map tool may implement the determined gesture as applied to the map view and render an updated map view of the map region, where the rendering is based on the determined gesture as applied to the map view, as reflected in stage 428. In other words, if the gesture as input shared characteristics with both a rotate and a tilt gesture, then the determining, for example, that the input gesture is a rotate gesture, the updated map view is a rotated version of the map view on which the gesture was performed.

In some embodiments, in addition to disambiguating between different types of gestures, before the determined gesture is implemented, the map tool may determine a modification to the gesture implementation to be applied, where the updated map view is based on the gesture implementation as modified according to the modification. The modification may be determined similar to the embodiments discussed above in regard to FIG. 4A.

Figure 4C:
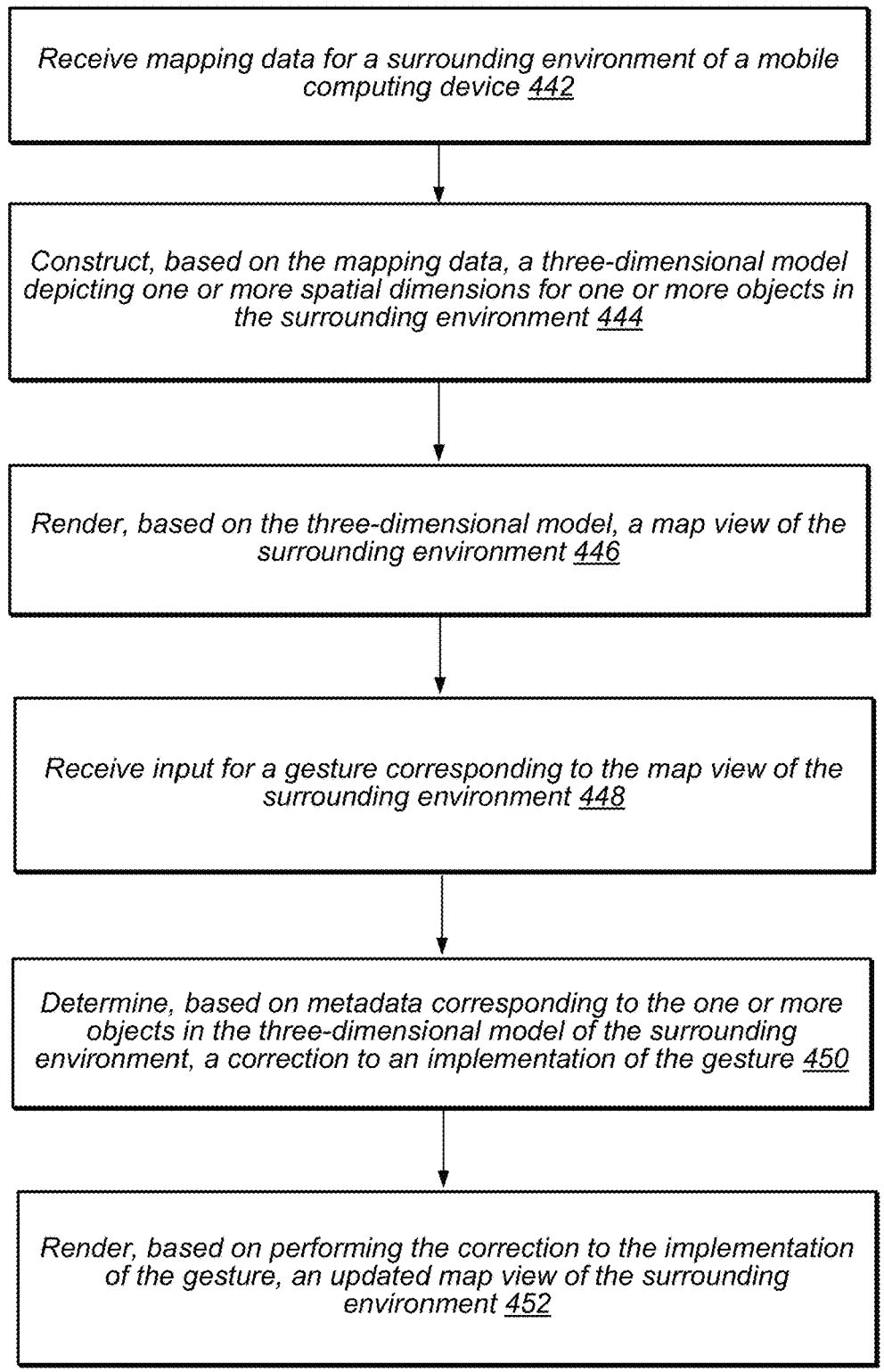

As per FIG. 4C, in some embodiments, a map tool may receive mapping data for a map region corresponding to the surrounding environment of a mobile computing device, as reflected in stage 442. The map tool may construct, based on the mapping data, a three-dimensional model of the map region, where the 3D model depicts one or more spatial dimensions of one or more objects in surrounding environment, as reflected in stage 444. The mapping data may be received or requested from Map Service 380.

Figure 5A:
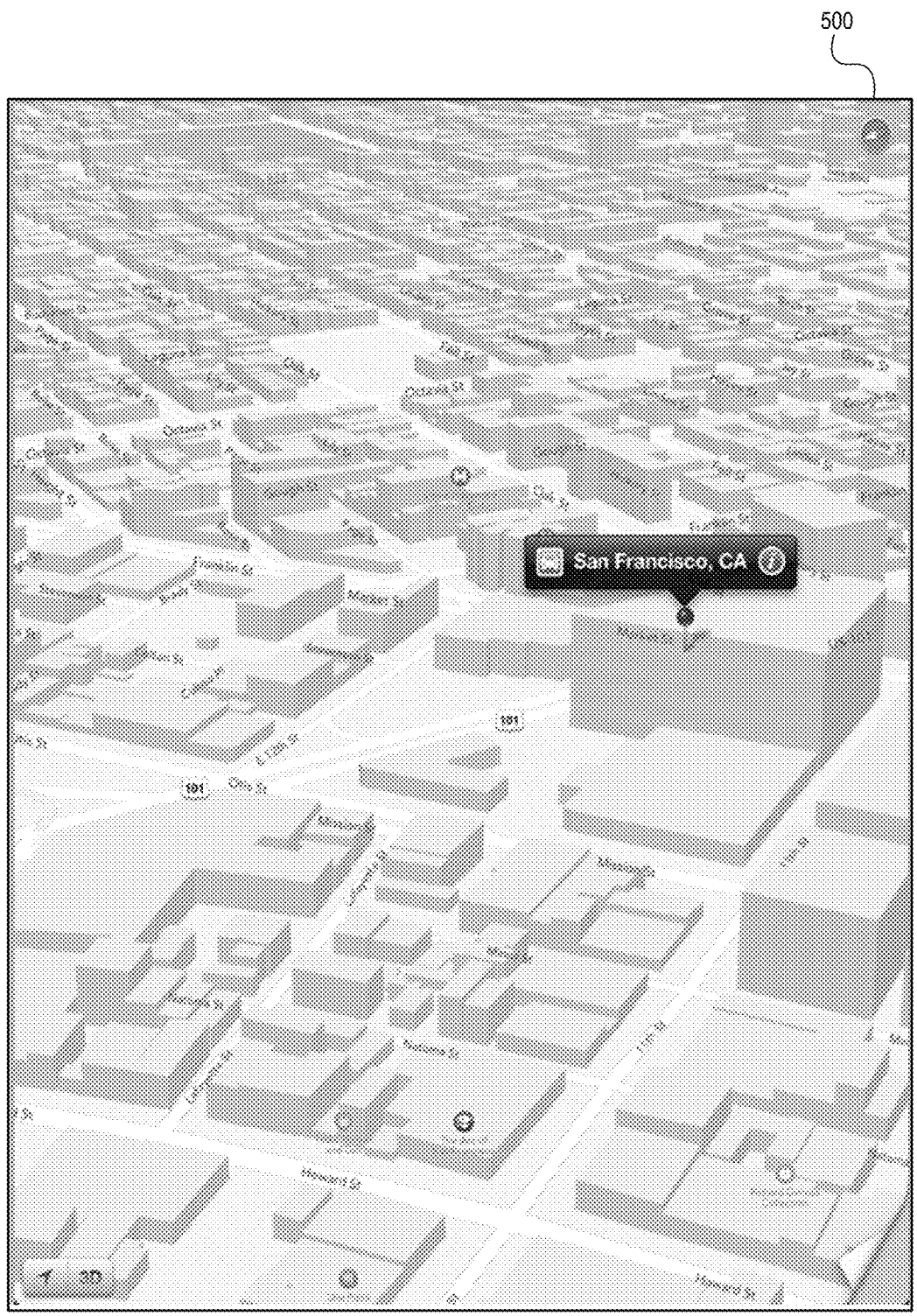
FIGS. 5A-5C depict illustrations of various map views, according to some embodiments.
Figure 5B:
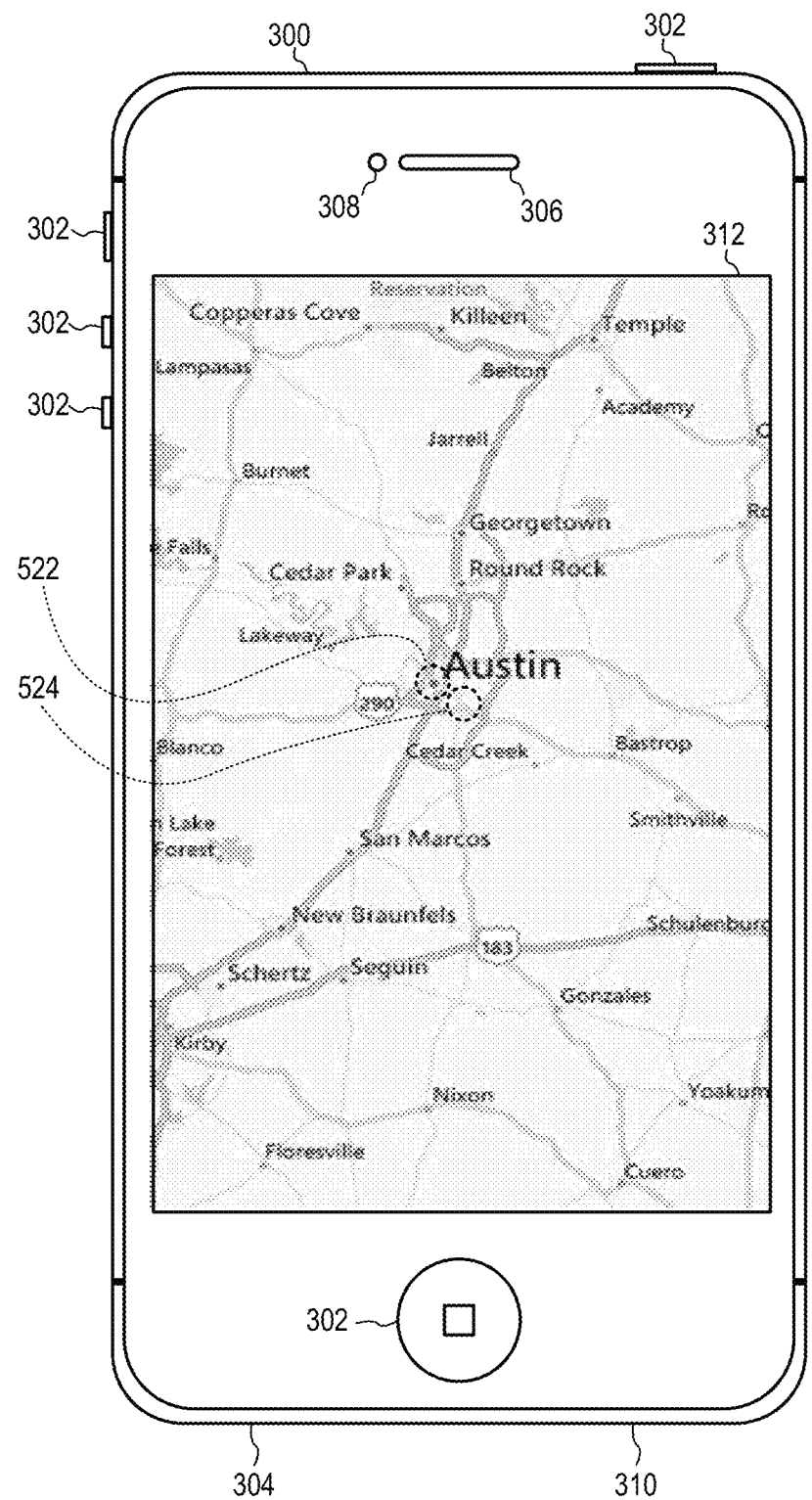

Based on the constructed 3D model, the map tool may render a map view of the surrounding environment corresponding to the map region, as reflected in stage 446. An example rendering of a map view is illustrated map view 500 in FIG. 5A. Given the map view displayed on a screen, a user may perform a gesture to interact with the map view. The map tool may receive input for the gesture corresponding to the map view of the surrounding environment, as reflected in stage 448.

As described above in regard to FIG. 4B, the map tool may then determine, based on metadata corresponding to the one or more objects in the 3D model of the surrounding environment, a correction to the gesture implementation, as reflected in stage 450. As discussed above, the map tool may determine a correction to be applied to the gesture implementation in order for the corrected gesture implementation to provide a map view depicting cartographic elements that would not be visible had the gesture as input by the user been performed. Once the map tool has determined a correction to the gesture implementation, the map tool may render, based on the gesture implementation as modified according to the determined correction, an updated map view of the surrounding environment corresponding to the updated map view and updated map region, as reflected in stage 452.

Figure 4D:
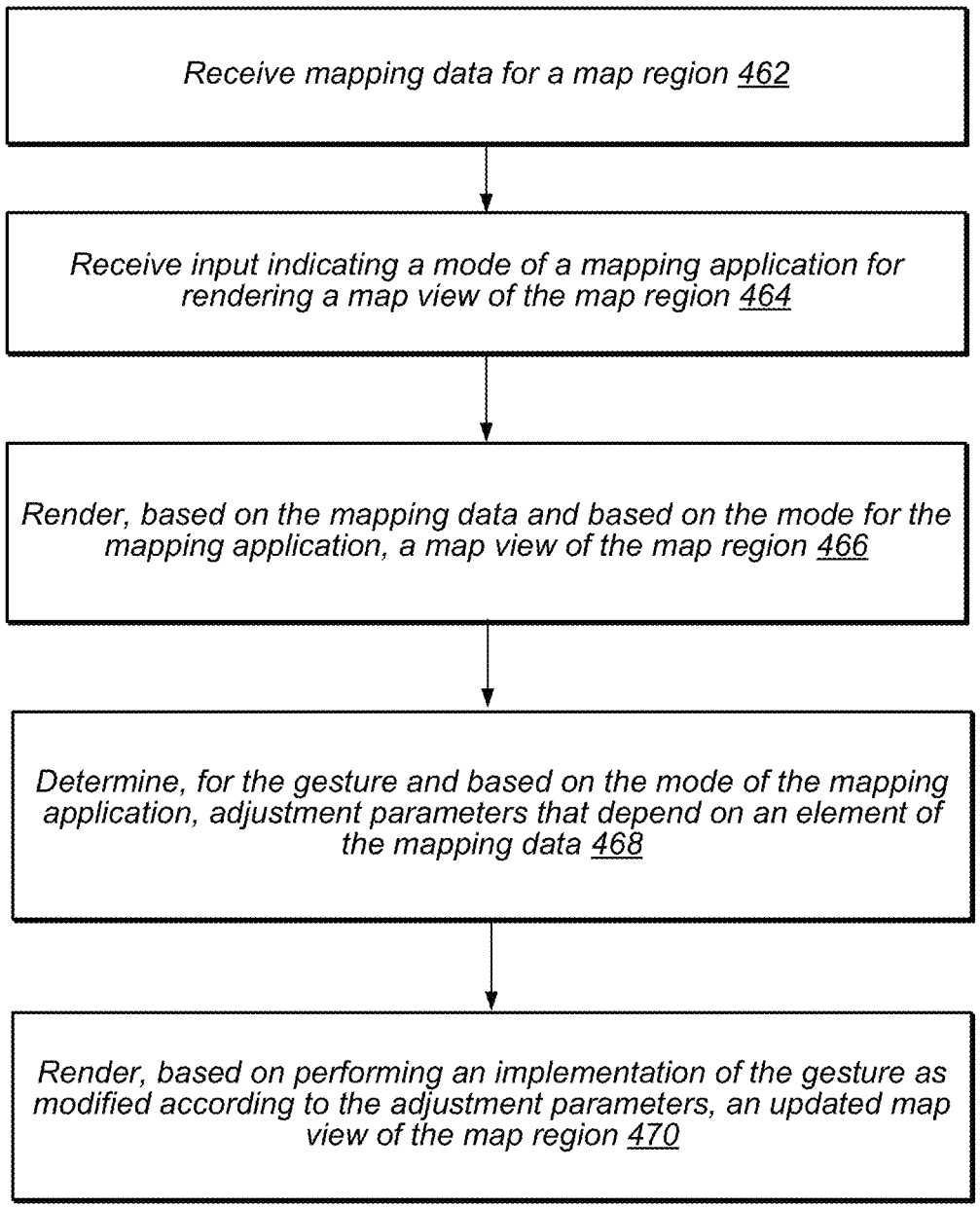

As per FIG. 4D, in some embodiments, a map tool may receive mapping data for a map region, as reflected in stage 462. The map tool may further receive information from the operating system or input from a user indicating a mode of a mapping application, where the mapping application, through the map tool, renders a map view of the map region, as reflected in stage 464. The mapping data may be received or requested from Map Service 380.

The map tool, based on the mapping data and based on the mode for the mapping application, may render a map view of the map region, as reflected in stage 466. For example, the mapping application may provide an interface to a user where the user may enter a destination address or destination location or point of interest. The mapping application may then determine a route from a starting location or the user's current location to reach the destination. The details of the route and an indication of progress along the route may be presented to a user in a navigation mode. The interface of a navigation mode, in some cases, may be different from the interface for the mapping application that is presented in other modes. For example, in a navigation mode, the mapping application may automatically update the user's location along the route from the source location to the destination.

Figure 5C:
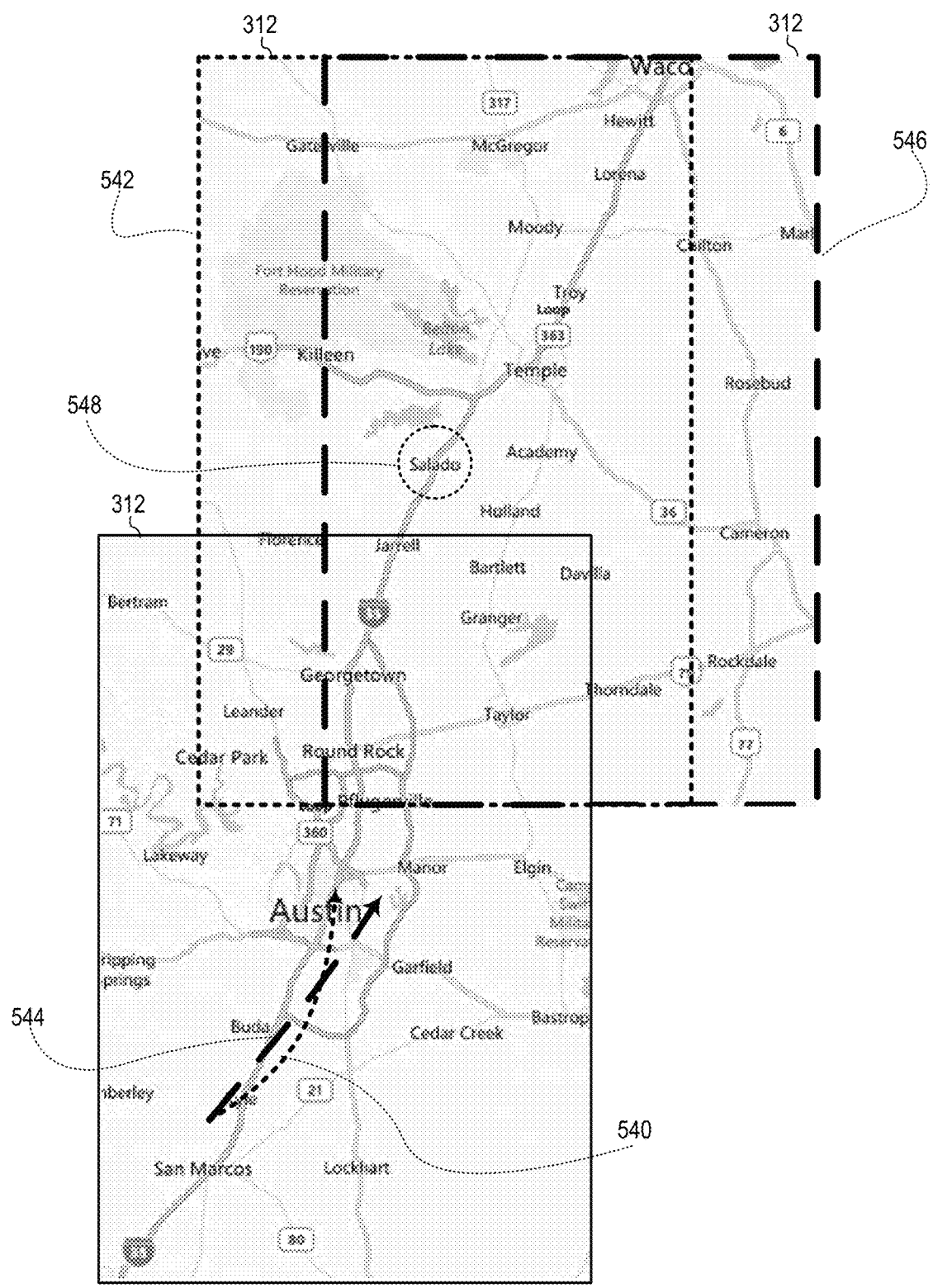

The map tool may then, based on the mode of the mapping application, determine adjustment parameters that depend on an element of the mapping data, as reflected in stage 468. For example, in FIG. 5C the parameters of a drag gesture on a 2D map view would correspond to the beginning and ending coordinates of the trace 544 of the input gesture. In this example, the result of the gesture as input would be the map view 546. If the destination is the city of Salado, depicted by element 548, then at the end of the unmodified gesture implementation input by a user, the user would see map view 546, which places Salado at the edge of the map view. Therefore, in this example, the user would determine an adjustment to the parameters of the gesture as input by the user, and determine a gesture implementation that traces the path 540 instead of path 544, where path 544 is the path for the original input gesture. In this example, the map view presented to the user after the modified gesture implementation has been implemented is map view 542, which places the destination city of Salado in the center of the map view. While this example is in regard to a two-dimensional map view, the map tool applies a similar process for the adjustment of parameters to a gesture implementation with any other gesture and in with any other map view.

In some embodiments, similar to the behavior in interpreting a pan gesture while a user is in navigation mode, the map tool may determine how to modify an implementation of a pinch gesture based on being in navigation mode. For example, if a user is navigating to Salado using the navigation mode of a map view, as discussed above, then when a user pinches on the map view display to see a greater amount of map region, then the map tool may adjust which areas of the map region come are displayed in the map view by modifying the interpretation of the pinch gesture based on elements in the map view related to the current navigation mode settings, including the route information, the current location, the starting location, or the destination, or including a balance of all of these factors. For example, in response to receiving the pinch gesture, the map tool may modify the implementation of the pinch gesture to increase the amount of the map region displayed to include more of the navigation route than would have been displayed if the map tool had implemented the actual pinch gesture without any modifications to the pinch gesture implementation. A similar analysis may be performed by the map tool when the user pinches in order to zoom in to a current map view.

Given adjustment parameters, the map tool may then render an updated view of the map region, where the updated view is based on the implementation of the gesture implementation as modified according to the adjustment parameters, as reflected in stage 470.

Figure 4E:
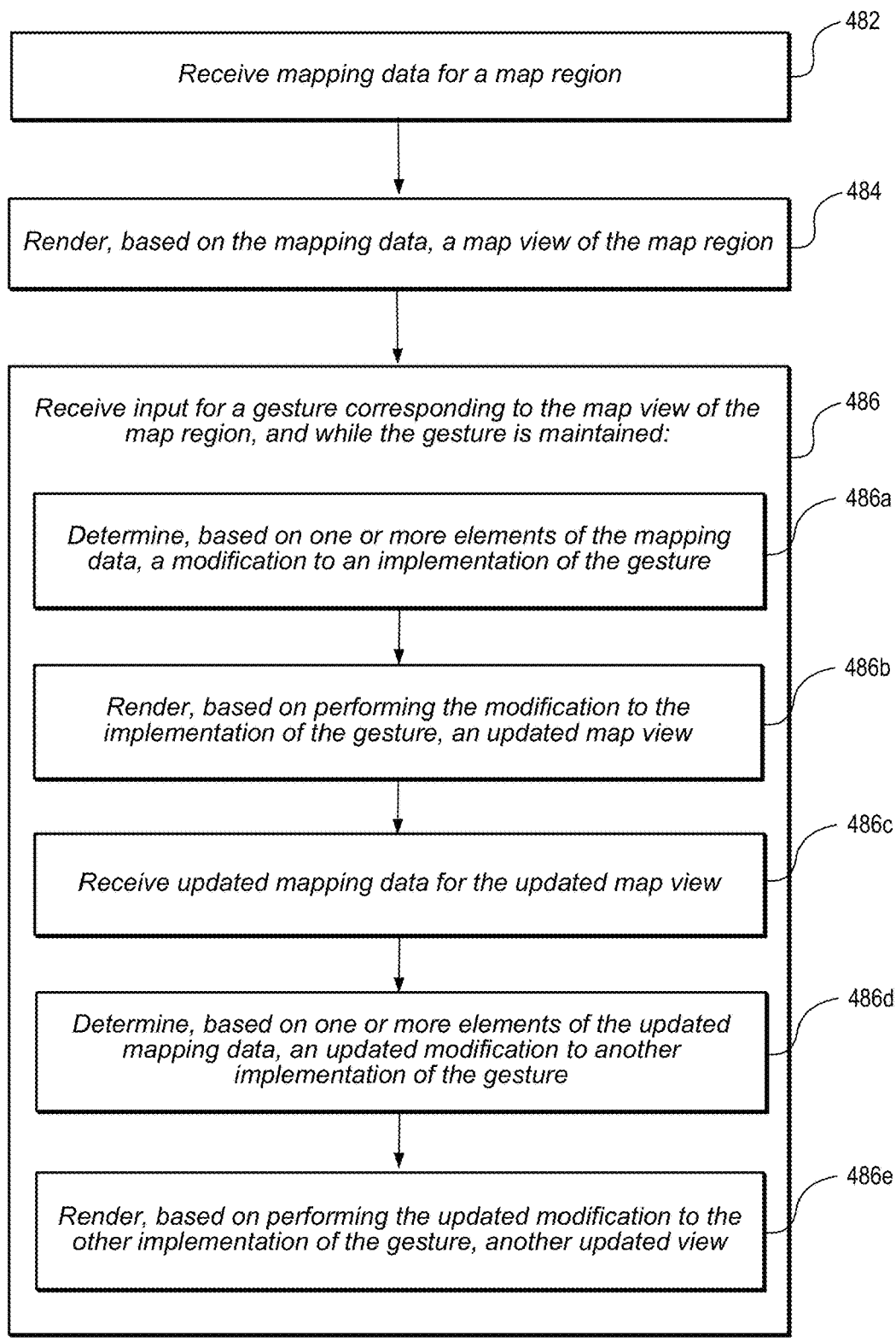

As per FIG. 4E, in some embodiments, a map tool may receive mapping data for a map region, as reflected in stage 482. Given the mapping data, the map tool may then render, based on the mapping data, a map view of the map region, as reflected in stage 484. The mapping data may be received or requested from Map Service 380.

In this embodiment, the map tool may perform several adjustments to a user gesture implementation as the user is making the gesture. This may provide a better user experience in cases where, for example, a user is dragging along a navigation route, and instead of updating a map view that corresponds to the user gesture, the map tool updates the map view to that provides more information related to the route the user is traveling. This is a similar process as described with regard to FIG. 4D, however, in this case, the gesture may be maintained and the map tool may continuously adjust the implementation of a user gesture so long as the gesture is maintained.

For example, in some cases, a user may wish to initiate a drag gesture to look ahead in the map view along the route, however, at some point, the user may reach the end of the display screen and not be able to continue the gesture. In this case, so long as the user maintains contact with the screen, or maintains the gesture, the map tool may scroll the map view so that the user continues to see more of the navigation route so long as the user maintains contact or maintains the gesture. Further, as more of the navigation route is displayed in the map view, what the user may see is not the map view as updated according to the last direction indicated by the user gesture, instead, the map tool may update the map view in order to continuously present information that is related to the navigation route. In other words, if a user's navigation route from El Paso, Tex. to New Orleans, La. takes the user along Interstate 10, then as the user maintains the gesture and sees more and more of the route, the map view may display as the central focus Interstate 10, even when Interstate 10 winds or otherwise veers from going in a straight west to east direction. In this way, Interstate 10 is the central focus of the map view from the beginning of the route until the end of the route. In cases where the map tool is not following a navigation route, the map tool may still perform similar continuing modifications to the user gesture implementation. For example, in scrolling from one location in a map view to another, instead of the map view being updated according to the gesture as performed by the user, the map tool may update the scrolling map view by adjusting the gesture implementation to continuously display elements in the map region of the map view may be of interest to the user based on any of the factors discussed elsewhere.

Given a map view rendered based on the mapping data, the map tool may then receive input for a gesture corresponding to the map view of the map region, as reflected in stage 486. Further, while the gesture is maintained, the map tool may determine, based on one or more elements of the mapping data, a modification to the gesture implementation, as reflected in stage 486*a*. Further, while the gesture is maintained, the map tool may render, based on performing the gesture implementation as modified according to the determined modification, an updated map view, as reflected in stage 486*b*. Further, while the gesture is maintained, the map tool may receive updated mapping data for an updated map view, as reflected in stage 486*c*. Further, while the gesture is maintained, the map tool may determine, based on one or more elements of the updated mapping data, an updated modification to the gesture implementation, as reflected in stage 486*d*. Further, while the gesture is maintained, the map tool may render, based on performing the gesture implementation as modified according to the updated modification, another updated map view, as reflected in stage 486*e*. In some embodiments, as an alternative to performing stage 486*e*, the map tool may render an updated map view where the rendering is based on the more recently modified gesture implementation, and where the more recently determined modification is applied to the most recently modified gesture implementation.

Map Tool Module

Figure 6:
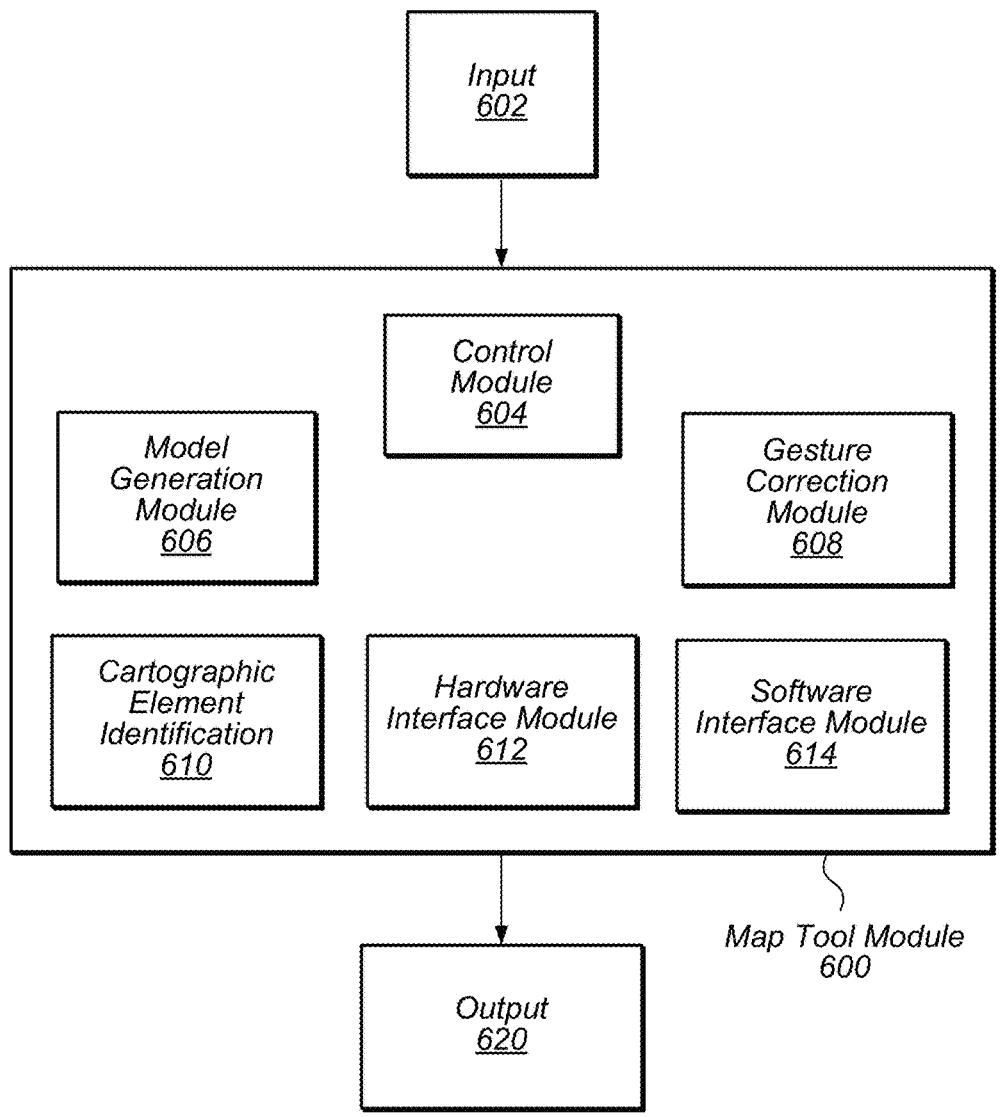
FIG. 6 illustrates an environment analysis tool module, according to some embodiments.

FIG. 6 illustrates an embodiment of an Map Tool Module 600. As noted above, the Map Tool Module 600 may implement a variety of different embodiments of a map tool.

In some embodiments, Control Module 604 may receive Input 602, which may be various types of mapping data or metadata or data describing parameters of a gesture, as described above with respect to FIGS. 4A-4E. Given mapping data, Control Module 604 may invoke Model Generation Module 606 to generate a model of the surrounding environment, according to various embodiments discussed above. Given a model, Cartographic Element Identification 610 may make determinations regarding elements of the surrounding environment that may serve as the basis for the modifying a user gesture, according to various embodiments discussed above.

Given a model of the surrounding environment and a rendering of a map view, Control Module 604 may invoke Hardware Interface Module 612 or Software Interface Module 614 in order to detect or to modify a gesture implementation. In some cases, depending on the input, Map Tool Module 600 may communicate with Map Service 380 to request or receive mapping information.

Gesture Correction Module 608 may perform calculations regarding how to modify parameters to a given gesture according to cartographic elements identified by Cartographic Element Identification module 610. Gesture Correction Module 608 may modify a gesture implementation according to any of the embodiments discussed above.

Depending on the embodiment and current state, Control Module 604 may provide as output 620 as a rendered map view or modified gesture parameters for implementation by Contact/Motion Module 130.

Example Computer System

Figure 7:
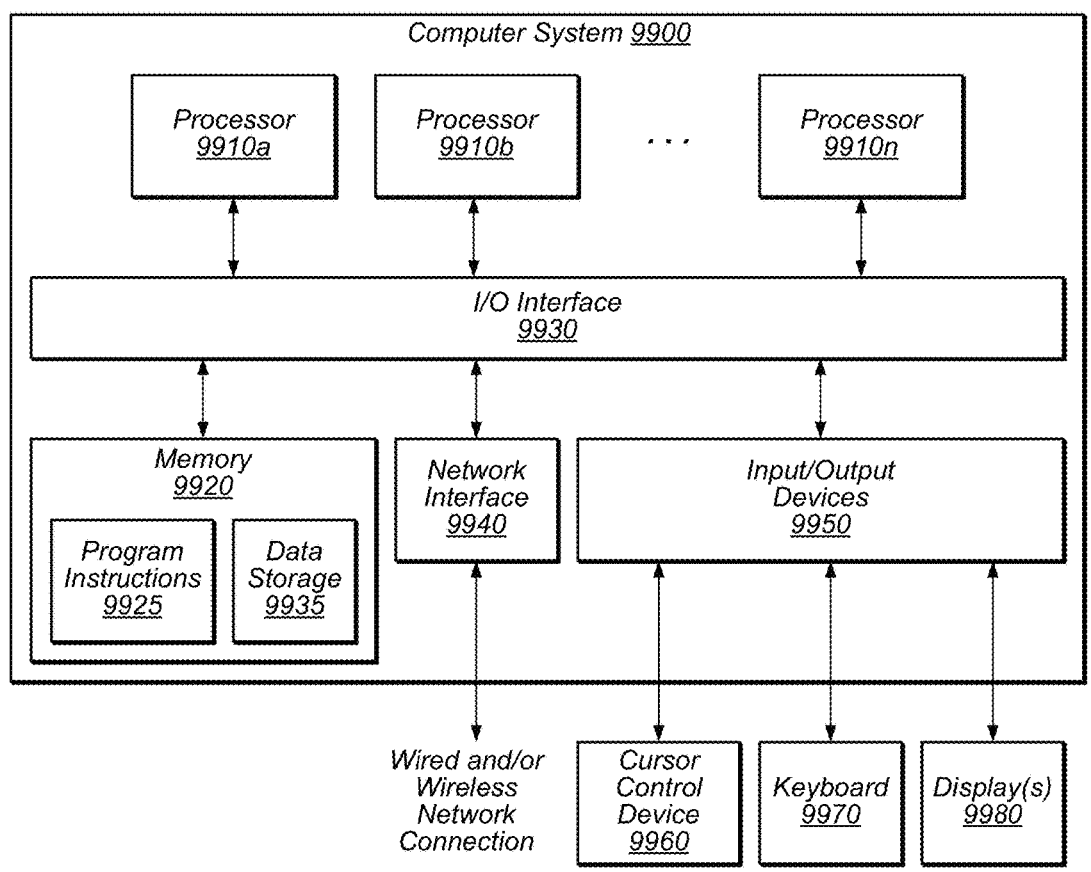
FIG. 7 depicts elements of an example computer system capable of implementing an environment analysis tool.

FIG. 7 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9360*a*-9360*n* coupled to system memory 9370 via input/output (I/O) interface 9380. The computer system further includes network interface 9390 coupled to I/O interface 9380, and one or more input/output devices 9382, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9370 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:

performing, by one or more computing devices:

receiving mapping data comprising one or more one or more elements corresponding to one or more physical features of a map region;

rendering, based on the mapping data, a map view of the map region;

receiving input for a gesture corresponding to the map view of the map region;

determining, based on proximity of coordinates in the mapping data corresponding to a coordinate point of the gesture in the map view relative to coordinates of the one or more elements of the mapping data, a target element for the gesture from among the one or more elements of mapping data, wherein the target element is visible in the map view, and wherein coordinates of the target element in the mapping data differ from the coordinates in the mapping data corresponding to the coordinate point of the gesture in the map view;

determining whether the target element would not be visible in the map view resulting from an implementation of the gesture under original gesture parameters;

in response to a determination that the implementation of the gesture would fail to display the target element in the map view, determining a modification, based on the coordinates of the target element in the mapping data and based on a speed of the gesture, to the implementation of the gesture differing from the original gesture parameters such that the modification to the implementation of the gesture corresponds to a redirection of the gesture toward the target element in an updated map view; and rendering, based on performing the modification to the implementation of the gesture, the updated map view of the map region.

2. The method of claim 1, wherein the mapping data comprises different categories of metadata corresponding to the one or more elements of the mapping data, including one or more of neighborhood metadata, point of interest metadata, travel metadata, social network-based metadata, profile-based metadata, or configuration setting-based metadata.

3. The method of claim 2, further comprising:

determining, based on each respective category of metadata, a respective likely target for the gesture; and determining, based on each determined likely target, a consolidated likely target for the gesture.

4. The method of claim 1 further comprising:

triggering an animation sequence to decelerate map view updates after completion of the gesture; and determining, based on the mapping data, a modification to an implementation of the animation sequence;

wherein said rendering is further based on performing the modification to the implementation of the animation sequence.

5. The method of claim 1, wherein said determining the modification to the gesture implementation is further based on a proximity between where the gesture as received would have placed a focus of the map view and an element of the one or more elements of the mapping data.

6. A system, comprising:

a computing device comprising at least one processor; and a memory comprising program instructions, wherein the program instructions are executable by the at least one processor to:

receive mapping data comprising one or more elements corresponding to one or more cartographic features of a map region;

render, based on the mapping data for the map region, a map view of the map region;

receive input for a gesture that shares characteristics with two different types of gestures, wherein the gesture corresponds to the map view of the map region, and wherein the two different types of gestures comprise at least two of a pan gesture, a tilt gesture, a pinch gesture, a zoom in gesture, a zoom out gesture, or a rotate gesture;

determine, based on proximity of coordinates in the mapping data corresponding to a coordinate point of the gesture in the map view relative to coordinates of the one or more elements of the mapping data:

a first end result corresponding to a first element of the mapping data, wherein the first end result corresponds to implementing the gesture as a first type of gesture of the two different types of gestures;

a second end result corresponding to a second element of the mapping data, wherein the second end result corresponds to implementing the gesture as a second type of gesture of the two different types of gestures;

based on a comparison of the first end result and the second end result, determine that the gesture is one type of the two different types of gestures and not another type of the two different types of gestures, wherein the map view updated according to the one type of gesture of the two different types of gestures would produce an updated map view with more cartographically relevant elements; and render, based on the determined type of gesture as applied to the map view, an updated map view of the map region.

7. The system of claim 6, wherein to determine that the gesture is one type of the two different types of gestures and not another type of the two different types of gestures, the program instructions are further executable by the at least one processor to:

calculate respective probabilities for the first end result and the second end result being a target of the gesture.

8. The system of claim 6, wherein relevance of the cartographically relevant elements is based on map metadata including ranking information corresponding to a respective cartographic element, and wherein the ranking information is based on crowdsourced information.

9. The system of claim 8, wherein the ranking information is based on recent search history of a user, elements of a user profile of the user, elements of profiles of people within a social network of the user, or any combination thereof.

10. The system of claim 6, wherein to determine that the map view updated according to the one type of gesture of the two different types of gestures would produce an updated map view with more cartographically relevant elements, the program instructions are further executable by the at least one processor to:

determine, prior to rendering the updated map view, a modification to the determined type of gesture more cartographically relevant elements, wherein the modification is based on map metadata for the map region.

11. A non-transitory, computer-readable storage medium storing program instructions, wherein the program instructions are computer-executable to implement:

receiving mapping data for a surrounding environment of the mobile computing device, wherein the mapping data describes one or more physical features of the surrounding environment;

constructing, based on the mapping data, a three-dimensional model depicting one or more spatial dimensions for one or more objects in the surrounding environment;

rendering, based on the three-dimensional model, a map view of the surrounding environment;

receiving input for a gesture corresponding to the map view of the surrounding environment;

determining, based on proximity of coordinates in the mapping data corresponding to a coordinate point of the gesture in the map view relative to metadata corresponding to coordinates of the one or more objects in the three-dimensional model of the surrounding environment, a target element for the gesture from among the one or more objects, wherein the target element is visible in the map view, and wherein coordinates of the target element in the mapping data differ from the coordinates in the mapping data corresponding to the coordinate point of the gesture in the map view;

determining whether the target element would not be visible in the map view resulting from an implementation of the gesture under original gesture parameters;

in response to a determination that the implementation of the gesture would fail to display the target element in the map view, determining a correction, based on the target element and on a speed of the gesture, to the implementation of the gesture differing from the original gesture parameters; and rendering, based on performing the correction to the implementation of the gesture, an updated map view of the surrounding environment.

12. The non-transitory, computer-readable storage medium of claim 11, wherein said constructing the three-dimensional model comprises:

identifying a footprint of an object of the one or more objects from two-dimensional mapping information;

correlating the footprint to a corresponding area in three-dimensional mapping information to find a height value; and determining, based on a height value, one of the one or more spatial dimensions;

extruding the footprint to the height value; and repeating said identifying, said correlating, said determining, and said extruding for each of the one or more objects.

13. The non-transitory, computer-readable storage medium of claim 11, wherein said determining a correction to the gesture implementation further comprises:

determining that an object in the map region would remain obscured or partially obscured in response to implementing the gesture; and in response to said determining that the object in the map region would remain obscured or partially obscured, determining an adjustment amount such that the gesture implementation as modified according to the adjustment amount would produce an updated map view with the object visible or more visible in the updated map view.

14. The non-transitory, computer-readable storage medium of claim 13, wherein said determining that the object in the map region would remain obscured or partially obscured further comprises:

determining that the object corresponds to map metadata indicating that the object is relevant to a current map operating mode.

15. The non-transitory, computer-readable storage medium of claim 13, wherein the adjustment amount is zero if the object corresponds to map metadata indicating that the object is more negatively reviewed than positively reviewed.

16. A method, comprising:
performing, by one or more computing devices:
receiving mapping data comprising one or more one or more elements corresponding to one or more physical features of a map region;

receiving input indicating a mode of a mapping application for rendering a map view of the map region;

rendering, based on the mapping data and based on the mode for the mapping application, a map view of the map region;

receiving input for a gesture corresponding to the map view of the map region;

determining, for the gesture and based on the mode of the mapping application, a target element for the gesture from among one or more elements of mapping data, wherein the target element is visible in the map view, and wherein coordinates of the target element in the mapping data differ from the coordinates in the mapping data corresponding to the coordinate point of the gesture in the map view;

determining whether the target element would not be visible in the map view resulting from an implementation of the gesture under original gesture parameters;

in response to a determination that the implementation of the gesture would fail to display the target element in the map view, determining adjustment parameters that differ from the original gesture parameters and depend on proximity of the coordinates in the mapping data corresponding to the coordinate point of the gesture in the map view relative to the coordinates of the target element of the mapping data and depend on a speed of the gesture; and rendering, based on performing an implementation of the gesture as modified according to the adjustment parameters, an updated map view of the map region.

17. The method of claim 16, wherein said determining adjustment parameters further comprises:

constructing, based on the mapping data, a model of the map region;

determining, based on the model of the map region, that an object in the model would remain obscured or partially obscured in response to implementing the gesture according to the input as received; and in response to said determining that the object in the map region would remain obscured or partially obscured, determining an adjustment parameter such that the gesture implementation as modified according to the adjustment parameter would produce an updated map view with the object visible or more visible in the updated map view.

18. A method, comprising:
performing, by one or more computing devices:
receiving mapping data for a map region;
receiving input indicating a mode of a mapping application for rendering a map view of the map region;
rendering, based on the mapping data and based on the mode for the mapping application, a map view of the map region;

receiving input for a gesture corresponding to the map view of the map region;

determining, for the gesture and based on the mode of the mapping application, an adjustment parameters that depend on an element of the mapping data, wherein said determining the adjustment parameter further comprises:

determining that an object in the map view would be obscured or partially obscured in response to implementing the gesture according to the input as received, and that the object corresponds to map metadata indicating that the object corresponds to positive ranking information; and determining, based on the positive ranking information, the adjustment parameter such that the gesture implementation as modified according to the adjustment parameter would produce an updated map view with the object visible or more visible in the updated map view as compared to the gesture implementation as modified according to only the input as received; and rendering, based on performing an implementation of the gesture as modified according to the adjustment parameter, an updated map view of the map region.

19. The method of claim 17, wherein said determining the adjustment parameter further comprises:

determining that the object corresponds to map metadata indicating that the object corresponds to negative ranking information; and reducing the adjustment parameter according to a measure of the negative ranking information.

20. The method of claim 17, wherein said determining the adjustment parameter further comprises:

determining that the object corresponds to map metadata indicating that the object corresponds to a high number of both negative reviews and positive reviews; and increasing the adjustment parameter according to the total number of reviews.

21. A method, comprising:

performing, by one or more computing devices:

receiving mapping data comprising one or more one or more elements corresponding to one or more physical features of a map region;

rendering, based on the mapping data, a map view of the map region; and receiving input for a gesture corresponding to the map view of the map region, and while the gesture is maintained:

determining, based on proximity of coordinates in the mapping data corresponding to a coordinate point of the gesture in the map view relative to coordinates of the one or more elements of the mapping data, a target element for the gesture from among the one or more elements of mapping data, wherein the target element is visible in the map view, and wherein coordinates of the target element in the mapping data differ from the coordinates in the mapping data corresponding to the coordinate point of the gesture in the map view; and determining whether the target element would not be visible in the map view resulting from an implementation of the gesture under original gesture parameters;

in response to a determination that the implementation of the gesture would fail to display the target element in the map view, determining a modification, based on the coordinates of the target element in the mapping data and based on a speed of the gesture, to the implementation of the gesture differing from the original gesture parameters such that the modification to the implementation of the gesture corresponds to a redirection of the gesture toward the target element in an updated map view, rendering, based on performing the modification to the implementation of the gesture, an updated map view, receiving updated mapping data for the updated map view, determine, based on one or more elements of the updated mapping data, an updated modification to another implementation of the gesture, and render, based on performing the updated modification to the other implementation of the gesture, another updated map view.

22. The method of claim 21, wherein said determining the modification to the gesture implementation is further based on a current map operating mode.

23. The method of claim 22, wherein the current map operating mode is a navigation mode.

24. The method of claim 23, wherein said determining the modification to the gesture implementation further comprises:

determining the modification to the gesture implementation to such that the modification to the gesture implementation results in an updated map view that is focused on a navigation route corresponding to the navigation mode.

25. The method of claim 23, wherein said determining the modification to the gesture implementation further comprises:

determining the modification to the gesture implementation to such that the modification to the gesture implementation results in an updated map view that is focused on one or more points of interest along a navigation route corresponding to the navigation mode.

* * * * *